(12) United States Patent
Kruft et al.

(10) Patent No.: US 10,751,983 B1
(45) Date of Patent: Aug. 25, 2020

(54) MULTILAYER COMPOSITE STRUCTURE HAVING GEOMETRICALLY DEFINED CERAMIC INCLUSIONS

(71) Applicants: Jonathan G. Kruft, Rockville, MD (US); Brandon L. Good, Doylestown, PA (US)

(72) Inventors: Jonathan G. Kruft, Rockville, MD (US); Brandon L. Good, Doylestown, PA (US)

(73) Assignee: The United States of America, as represented by the Secretary of the Navy, Washington, DC (US)

( * ) Notice: Subject to any disclaimer, the term of this patent is extended or adjusted under 35 U.S.C. 154(b) by 348 days.

(21) Appl. No.: 15/360,708

(22) Filed: Nov. 23, 2016

(51) Int. Cl.
  *B32B 37/02* (2006.01)
  *B32B 5/02* (2006.01)
  (Continued)

(52) U.S. Cl.
  CPC .............. *B32B 37/02* (2013.01); *B32B 5/024* (2013.01); *B32B 18/00* (2013.01); *B32B 25/10* (2013.01);
  (Continued)

(58) Field of Classification Search
  CPC ......... B32B 5/024; B32B 37/02; B32B 18/00; B32B 25/10; B32B 27/38; B32B 27/12; B32B 38/08
  (Continued)

(56) References Cited

U.S. PATENT DOCUMENTS

| 3,563,836 A | 2/1971 | Dunbar |
| 4,030,427 A | 6/1977 | Goldstein |

(Continued)

OTHER PUBLICATIONS

U.S. Appl. No. 15/360,734, filed Nov. 23, 2016, inventors Jonathan G. Kruft, Brandon L. Good, and David A. Roper, invention entitled "Composite Material System Including Elastomeric, Ceramic, and Fabric Layers".

(Continued)

*Primary Examiner* — Elizabeth C Imani
(74) *Attorney, Agent, or Firm* — Howard Kaiser

(57) ABSTRACT

According to exemplary inventive practice, ceramic powder or slurry is selectively deposited at many discrete locations on each of many fiberglass fabric substrates. The sizes and/or shapes of the ceramic deposits vary among the substrates. The substrates are selectively ordered and stacked so that perpendicular through-plane alignments of respective ceramic deposits form selected three-dimensional geometric shapes. The resultant stack of substrates, characterized by many three-dimensional ceramic inclusions, is impregnated with an elastomer or an epoxy that binds the ceramic-deposited substrates together, resulting in a finished composite product. Inventive composite structures can be multifariously designed and embodied to afford selected ballistic and/or structural and/or electromagnetic qualities. Another mode of inventive practice provides for incorporation of the above-described inventive composite product as a layer in a multilayer composite system that also includes a high strain-rate-sensitivity-hardening polymer layer, a hybrid composite fabric layer, a ceramic layer, and a polymeric ballistic fabric layer.

23 Claims, 20 Drawing Sheets

(51) Int. Cl.
*B32B 18/00* (2006.01)
*B32B 27/38* (2006.01)
*B32B 25/10* (2006.01)
*B32B 27/12* (2006.01)
*B32B 38/08* (2006.01)

(52) U.S. Cl.
CPC .............. *B32B 27/12* (2013.01); *B32B 27/38* (2013.01); *B32B 38/08* (2013.01)

(58) Field of Classification Search
USPC ........................................................ 428/196
See application file for complete search history.

(56) References Cited

U.S. PATENT DOCUMENTS

| | | | |
|---|---|---|---|
| 4,179,979 A * | 12/1979 | Cook | F41H 5/0414 |
| | | | 109/49.5 |
| 6,532,857 B1 | 3/2003 | Shih et al. | |
| 7,300,893 B2 | 11/2007 | Barsoum et al. | |
| 7,383,761 B2 | 6/2008 | Warren et al. | |
| 7,472,637 B2 | 1/2009 | Sarva et al. | |
| 7,543,523 B2 | 6/2009 | Hunn | |
| 7,608,322 B2 | 10/2009 | Thurau et al. | |
| 7,685,922 B1 | 3/2010 | Martin et al. | |
| 7,688,278 B2 | 3/2010 | Frenkel | |
| 7,794,808 B2 | 9/2010 | Dudt et al. | |
| 7,866,248 B2 | 1/2011 | Moore, III et al. | |
| 7,921,759 B2 | 4/2011 | Warren | |
| 7,938,053 B1 | 5/2011 | Dudt et al. | |
| 7,946,211 B1 | 5/2011 | Winchester et al. | |
| 8,065,946 B2 | 11/2011 | Weber et al. | |
| 8,074,553 B1 | 12/2011 | Warren | |
| 8,091,464 B1 | 1/2012 | Imholt et al. | |
| 8,096,223 B1 | 1/2012 | Andrews | |
| 8,096,224 B2 | 1/2012 | Martin et al. | |
| 8,215,223 B2 | 1/2012 | Lucuta et al. | |
| 8,220,378 B2 | 7/2012 | Gamache et al. | |
| 8,322,267 B2 | 12/2012 | Altergott et al. | |
| 8,387,510 B1 | 3/2013 | Martin et al. | |
| 8,580,387 B1 | 11/2013 | Fedderly et al. | |
| 8,746,122 B1 | 6/2014 | Roland et al. | |
| 8,789,454 B1 | 6/2014 | Roland et al. | |
| 8,857,311 B2 | 10/2014 | Warren | |
| 9,038,332 B1 | 5/2015 | Littlestone et al. | |
| 9,046,325 B1 | 6/2015 | Littlestone et al. | |
| 9,207,048 B1 | 12/2015 | Roland et al. | |
| 9,285,191 B2 | 3/2016 | Roland et al. | |
| 9,677,858 B1 | 6/2017 | Speyer et al. | |
| 9,797,691 B1 | 10/2017 | Hunn et al. | |
| 9,859,533 B2 | 1/2018 | Vanarsdalen et al. | |
| 10,215,537 B2 | 2/2019 | Ganor | |
| 2004/0092183 A1 * | 5/2004 | Geva | B32B 5/02 |
| | | | 442/134 |
| 2014/0230638 A1 | 8/2014 | Waldrop | |
| 2019/0041168 A1 | 2/2019 | Gamache et al. | |

OTHER PUBLICATIONS

U.S. Appl. No. 15/360,734, USPTO Office action dated Feb. 21, 2019, 10 pages total, including non-final rejection, Office action summary, and examiner's search information/strategy.

Amendment (17 pages, filed Aug. 22, 2019; responsive to non-final office action dated Mar. 27, 2019), U.S. Appl. No. 15/360,734, filed Nov. 23, 2016, inventors Jonathan G. Kruft, Brandon L. Good, and David A. Roper, invention entitled "Composite Material System Including Elastomeric, Ceramic, and Fabric Layers," Navy Case No. 103,724.

USPTO final Office action dated Nov. 1, 2019, U.S. Appl. No. 15/360,734, 10 pages total, including cover sheet, Office action summary, final rejection, and examiner's search notes.

* cited by examiner

II. STACKING OF THE MULTIPLE CERAMIC-DEPOSITED SUBSTRATES 65 TO FORM A LAYERED COMPOSITE PREFORM 650

MULTILAYER COMPOSITE STRUCTURE HAVING GEOMETRICALLY DEFINED CERAMIC INCLUSIONS

BACKGROUND OF THE INVENTION

The present invention relates to composite structures, more particularly to composite structures (e.g., composite armor structures) that include ceramic material and non-ceramic material.

Many composite structures are designed to serve primarily a structural purpose. Nevertheless, it may be desirable that a composite structure have one or more attributes beside structural supportability, such as armor protectiveness or electromagnetic effectiveness. The current state of the art is such that the ability to simultaneously achieve double performance or triple performance (e.g., structural and/or ballistic and/or electromagnetic performance) in a composite structure is limited. Fabrication of dual-performance composites or tri-performance composites has been problematical, and difficulties have increased with increasing numbers of different performance objectives. In particular, there is a dearth of information in the literature on how a single composite structure may be imbued with all three characteristics, viz., structural and ballistic and electromagnetic characteristics. Effective integration of both electromagnetic functionality and ballistic functionality within a composite structure remains elusive in the art.

The traditional approach to imparting armor (e.g., ballistic armor) character or electromagnetic character to a structural composite involves use of auxiliary or "parasitic" structure. That is, to enhance structural performance with electromagnetic or armor-protective (e.g., ballistic) performance, electromagnetically or armor-protectively functional materials are added to the exterior of structural composite materials. For instance, ceramic armor plates are bolted to the outer surface of a composite structure. A more integrative approach to lending armor-protective or electromagnetic performance to a composite structure has been considered in the art. In theory, at least, electromagnetic or ballistic materials may be integrated into the stack of a composite structure. However, the integrative approach has apparently seen scant practical success. Integration of disparate materials brings new challenges, such as pertaining to performances of individual materials, and to interactions between plural materials.

Military armor applications include land vehicles, marine vehicles, air vehicles, stationary structures, and personnel. Armor is used typically to protect against impact by a projectile, such as a ballistic body (e.g., small arms fire) or an explosive fragment (e.g., shrapnel from a bomb blast). Various armor constructions and configurations are known that utilize ceramic material. Some armor systems and methods have been disclosed that involve implementation of discrete ceramic elements in combination with non-ceramic material. For instance, Shih et al. U.S. Pat. No. 6,532,857 B1 issued 18 Mar. 2003 entitled "Ceramic Array Armor," incorporated herein by reference, disclose an armor system that includes an elastomeric matrix (e.g., binder) material and, encapsulated therein, plural ceramic tiles arrayed along a common surface and spaced apart from one another.

As broadly defined, a ceramic material is an inorganic nonmetallic material made from a compound of a metal and a nonmetal. According to the broad definition adopted herein, a ceramic material can be crystalline, or can be partly crystalline and partly amorphous (e.g., "glass-ceramic"). Conventional ceramic armor materials include aluminum oxide (commonly called "alumina"), silicon carbide, boron carbide, and titanium carbide. Among other examples of ceramic materials are tungsten carbide, magnesium oxide, titanium dioxide, and porcelain.

SUMMARY OF THE INVENTION

In view of the foregoing, an object of the present invention is to provide a superior composite structure.

A further object of the present invention is to provide a superior composite structure that is suitable for use as a ballistic armor structure.

Another object of the present invention to provide a methodology for making a composite structure so as to afford plural functionalities in the composite structure.

In accordance with exemplary practice of the present invention, a method for making a composite structure includes providing a preform and infusing matrix material in the preform. The preform includes plural substrates and plural ceramic material quantities deposited on each substrate. The preform is characterized by a layered configuration wherein the substrates adjoin and wherein separate groups of the ceramic material quantities align through the adjoined substrates to describe corresponding three-dimensional ceramic material elements. Each three-dimensional ceramic material element is constituted by a combination of aligned ceramic material quantities deposited on corresponding substrates.

Exemplary practice of the present invention provides for geometric shaping of plural ceramic inclusions (e.g., multiple ballistic ceramic inclusions) in the context of a unitary composite structure. The ceramic inclusions can be shaped and arranged to afford armor protection and/or electromagnetic influence. In addition, the inventive composite structure can be made to be "structural" in the engineering sense of structurally supporting or constructively affecting an object. An exemplary composite material system according to the present invention is embodied to be characterized by multiple geometrically shaped ceramic inclusions distributed in a resinous or elastomeric matrix, and to afford two or three functionalities from among ballistic functionality, structural functionality, and electromagnetic functionality.

Inventive practice admits of both military and commercial applications. For example, an inventive embodiment of a ballistic armor structure may outperform existing ballistic armor structures. Structural and electromagnetic capabilities of an inventive material system may be incorporated by industry into commercial vehicles. The present invention can be embodied to provide a unitary composite structure that combines armor-protective, structural, and electromagnetically influential capabilities. Such combination of three functional capabilities is unique in the pertinent arts and can be beneficial in diverse applications. For instance, the combination of shaped ballistic ceramic inclusions with electromagnetic and structural properties may be advantageous for both large and small naval vessels.

Exemplary inventive practice includes shaping of ceramic inclusions in order to achieve one or more functional objectives. Ceramic inclusions are precisely tailored to provide electromagnetic and/or ballistic properties. For example, the present invention's precise tailoring of ceramic shapes so as to be situated in a resinous or elastomeric matrix can succeed in integrating one or two functionalities within a structural composite; the composite is thus characterized by three functionalities, viz., structural, armor-protective, and electromagnetic. Inventive practice of an integrative composite structure promises significant advantages over conventional practice of a parasitic counterpart composite structure. By inventively integrating different functionalities, an inventive composite structure may be lighter, thinner, and mechanically stronger, with higher ballistic and electromagnetic performance, as compared with a conventional composite structure.

Exemplary inventive practice features, inter alia, the selective depositing of a ceramic powder composition on individual substrates (e.g., sheets made of fiberglass fabric). Each substrate thereby acquires, on its substrate surface, an arrangement of individual ceramic deposits of selected two-dimensional sizes and shapes. The substrates (each having ceramic deposited thereon) are stacked in a selected alignment and order of the individual ceramic deposits on the respective substrates. The multi-substrate assembly is infused (and thereby joined or bound together) with a resinous or elastomeric material. The inventive result is a composite structure characterized by multiple three-dimensional ceramic inclusions that are patterned into the composite structure. The inventive composite is structurally characterized by integration of shaped ceramic inclusions in a stratified (layered) matrix. Furthermore, the inventive composite is functionally characterized by integration of two or all three capabilities among structural performance, armor (e.g., ballistic) performance, and electromagnetic performance.

Key features of exemplary inventive practice include: a non-metallic substrate suitable for implementation in a structural composite stack; a powder or powder-like slurry to incrementally deposit on the substrates; a periodic or non-periodic pattern of deposited powder material in a prescribed fill-factor; a 3D inclusion distribution, of prescribed fill-factor and shape, fabricated by stacking powder-patterned substrates.

Inventive practice admits of multifarious 3D geometrical shapes delineatingly made of ceramic material, including but not limited to conical, truncated conical, pyramidal, truncated pyramidal, cylindrical, prismatic, spherical, and hemispherical. The three-dimensional ceramic shape can include, for instance, a combination of two different 3D polyhedral shapes (pyramidal, truncated pyramidal, prismatic, etc.), or of two different 3D curved shapes (conical, truncated conical, cylindrical, spherical, and hemispherical, toroidal, etc.), or of a 3D polyhedral shape and a 3D curved shape. A combination of two 3D ceramic shapes can be of similar or dissimilar kinds of shapes. Inventive embodiments of the ceramic elements can have one or more characteristics among regularity, irregularity, uniformity, non-uniformity, symmetry, asymmetry, linearity, curvature, concavity, convexity, bending, twisting, simplicity, complexity, etc.

The terms "ceramic powder composition" and "ceramic powder material" are used interchangeably herein to refer to either a dry ceramic powder or a ceramic slurry (e.g., a mixture of ceramic powder with a liquid such as water or oil). The terms "fiberglass fabric," "fiberglass cloth," "fiberglass textile," and "fiberglass sheet" broadly and synonymously refer to a fabric, cloth, textile, or sheet that is made of fibrous glass material. For instance, glass fibers can be woven or otherwise configured to form an integral planar fiberglass entity. The terms "layer" and "stratum" are synonymous as used herein.

According to another mode of inventive practice, a multilayer composite system includes at least five layers, one layer of which is the afore-described inventive composite structure. In an exemplary multilayer composite system, a first layer includes a high strain-rate-sensitivity-hardening polymer. A second layer, adjacent to the first layer, includes a hybrid composite fabric. A third layer, adjacent to the second layer, is the afore-described inventive composite structure, which includes a preform and a matrix material infused in said preform, the preform including plural substrates and plural quantities of ceramic material deposited on each substrate. A fourth layer, adjacent to the third layer, includes a ceramic material. A fifth layer, adjacent to the fourth layer, includes a polymer ballistic fabric.

According to yet another mode of inventive practice, a multilayer composite system includes at least four layers, none of which is the afore-described inventive composite structure. In an exemplary multilayer composite system, a first layer includes a high strain-rate-sensitivity-hardening polymer. A second layer, adjacent to the first layer, includes a hybrid composite fabric. A third layer, adjacent to the second layer, includes a ceramic material. A fourth layer, adjacent to the third layer, includes a polymer ballistic fabric.

Other objects, advantages, and features of the present invention will become apparent from the following detailed description of the present invention when considered in conjunction with the accompanying drawings.

BRIEF DESCRIPTION OF THE DRAWINGS

The present invention will now be described, by way of example, with reference to the accompanying drawings, wherein:

FIG. 9 shows stacking of the eight ceramic-deposited substrates shown in FIGS. 1 through 8. FIG. 10 shows the stacking arrangement of FIG. 9 plus a blank substrate being stacked atop the ceramic-deposited substrate shown in FIG. 1.

FIG. 13 can be considered to represent either an inventive preform composite embodiment such as partially shown in FIG. 11, or an inventive finished composite embodiment such as partially shown in FIG. 12. Six ceramic cones are shown to be defined by the aligned stacking of substrates having circular ceramic deposits of progressively greater diameter.

FIG. 14 illustrates deposition of ceramic material on a fiberglass fabric substrate surface. FIG. 15 illustrates stacking of substrates similar to the depiction of stacking in FIG. 10, thereby making an inventive composite preform. FIG. 16 illustrates an infusion of a resinous or elastomeric material into the preform shown in FIG. 15, thereby making an inventive composite product.

FIG. 17 depicts a more angular version of a ceramic conical inclusion, as compared to that shown in FIG. 11. FIG. 18 depicts a slightly truncated ceramic conical inclusion. FIG. 19 depicts a moderately truncated ceramic conical inclusion.

FIG. 29 can be considered to represent either an inventive preform composite embodiment such as partially shown in FIG. 11, or an inventive finished composite embodiment such as partially shown in FIG. 12.

FIG. 30 depicts a composite laminate that includes, as one of several lamina, an inventive multi-stratified (multilayer) composite structure having geometrically defined ceramic inclusions, such as exemplified in FIGS. 12, 13, 16, and 29.

DESCRIPTION OF EXEMPLARY EMBODIMENTS OF THE INVENTION

Figure 2:
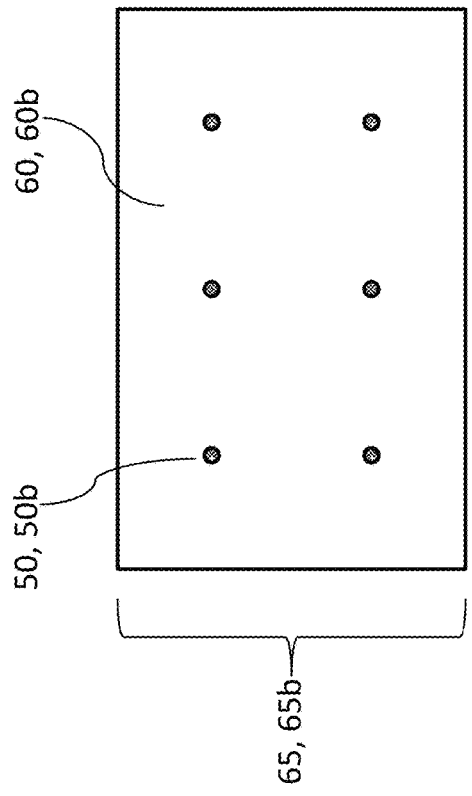
FIGS. 1 through 8 are similar diagrammatic plan views exemplifying a fiberglass fabric substrate having ceramic material deposited thereon in accordance with exemplary practice of the present invention. Six circular ceramic deposits are shown to be correspondingly placed with increasing size on identical substrates in successive figures from FIG. 1 to FIG. 8.
Figure 4:
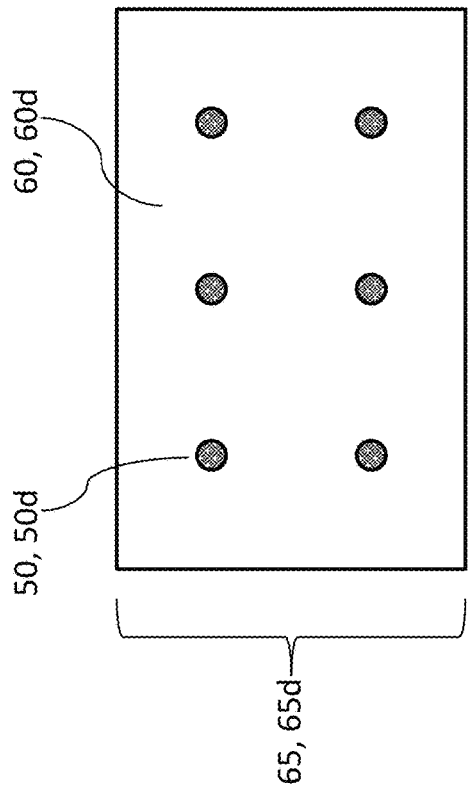
Figure 1:
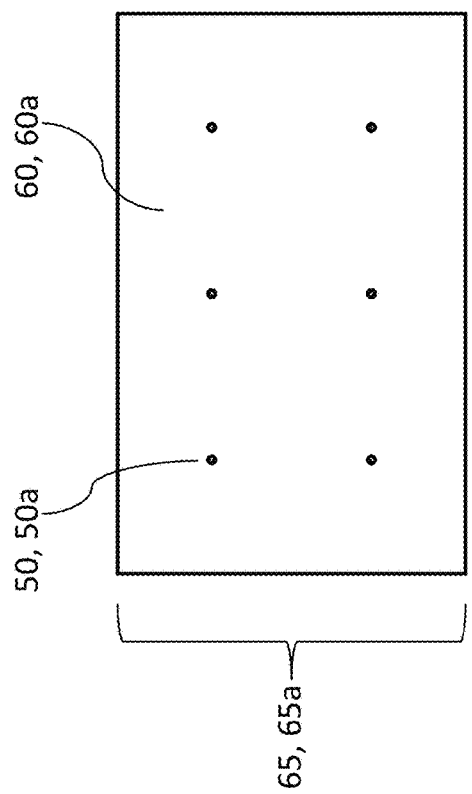
Figure 3:
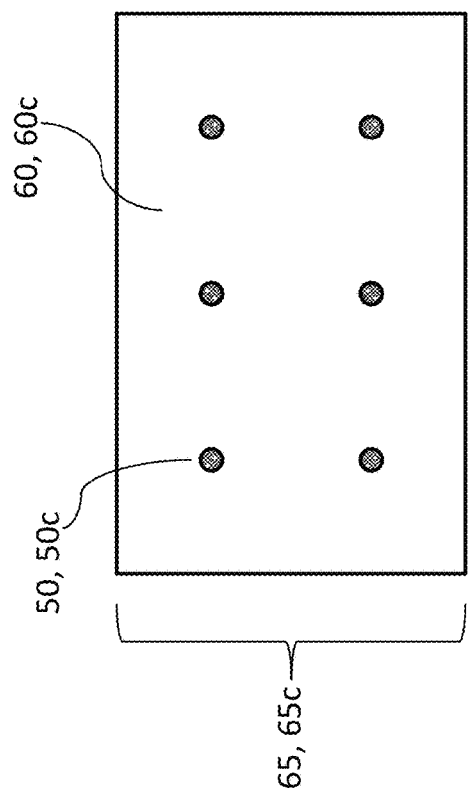
Figure 5:
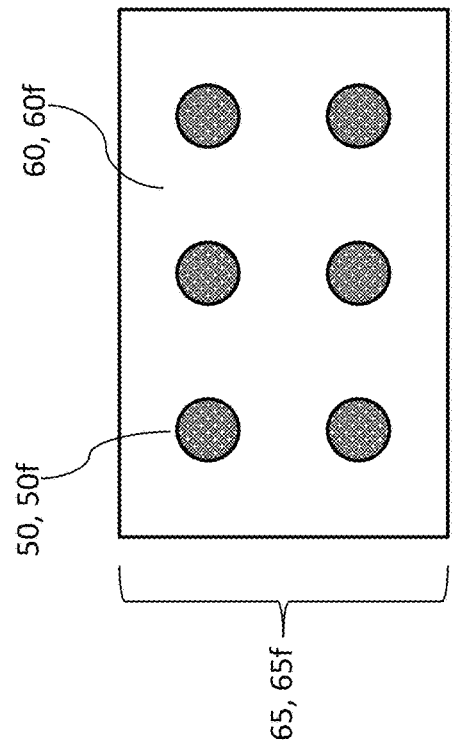
Figure 6:
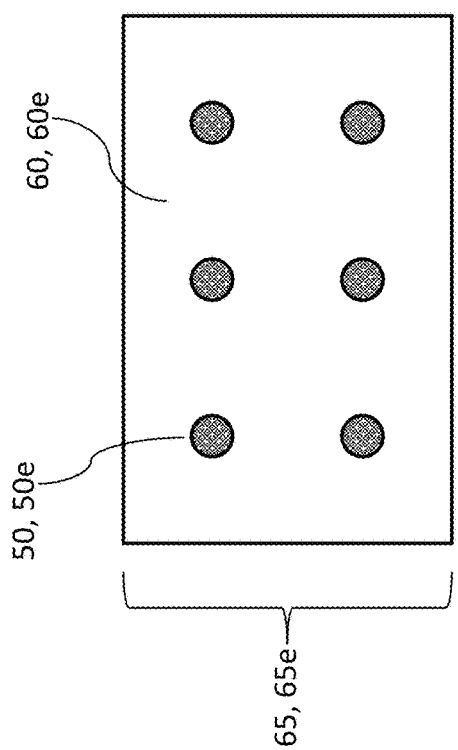
Figure 7:
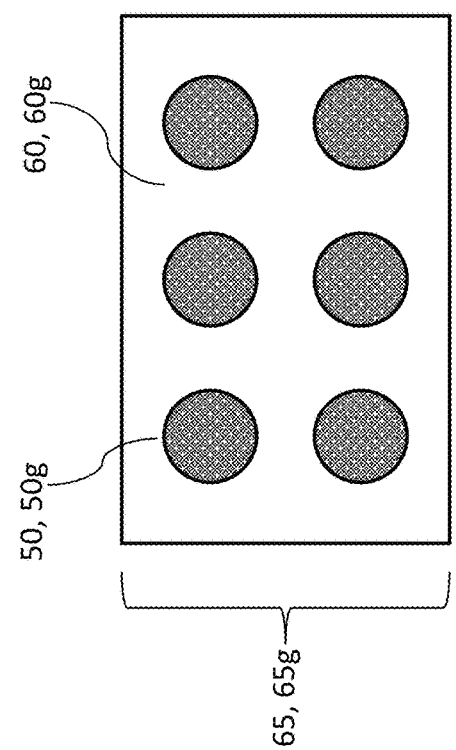

Referring now to the figures, exemplary practice of the present invention provides for construction of a multilayer composite structure 765. The construction includes implementation of a ceramic powder material, several/many substrates, and polymeric matrix material. In the example of inventive practice illustrated in FIGS. 1 through 16, six discrete circular quantities 50 of a ceramic powder material are deposited on each of eight congruent rectangular substrates 60 made of a fiberglass fabric material.

Terms such as "deposited ceramic quantity" and "ceramic deposit" are used interchangeably herein. Each substrate 60 having ceramic material 50 deposited thereon is designated herein a ceramic-deposited substrate 65. The eight substrates 60 are respectively designated herein substrates 60a, 60b, 60c, 60d, 60e, 60f, 60g, and 60h. Each substrate 60 is a nonmetallic fabric, for instance a fiberglass fabric such as a fiberglass S-glass fabric.

The ceramic quantities 50 deposited on the eight substrates 60 are respectively designated herein ceramic quantities 50a, 50b, 50c, 50d, 50e, 50f, 50g, and 50h. Circular ceramic quantities 50a, 50b, 50c, 50d, 50e, 50f, 50g, and 50h are respectively deposited on substrates 60a, 60b, 60c, 60d, 60e, 60f, 60g, and 60h. The eight ceramic-deposited substrates 65 are respectively designated substrates 65a, 65b, 65c, 65d, 65e, 65f, 65g, and 65h.

Examples of glass fiber materials that may be suitable for inventive practice of fiberglass fabric substrates 60 include but are not limited to E-glass, A-glass, E-CR-glass, C-glass, D-glass, R-glass, and S-glass. Examples of ceramic materials that may be suitable for inventive practice of ceramic quantities 50 include but are not limited to aluminum oxide (alumina), silicon carbide, boron carbide, titanium carbide, tungsten carbide, magnesium oxide, titanium dioxide, silicon nitride, and porcelain.

Figure 8:
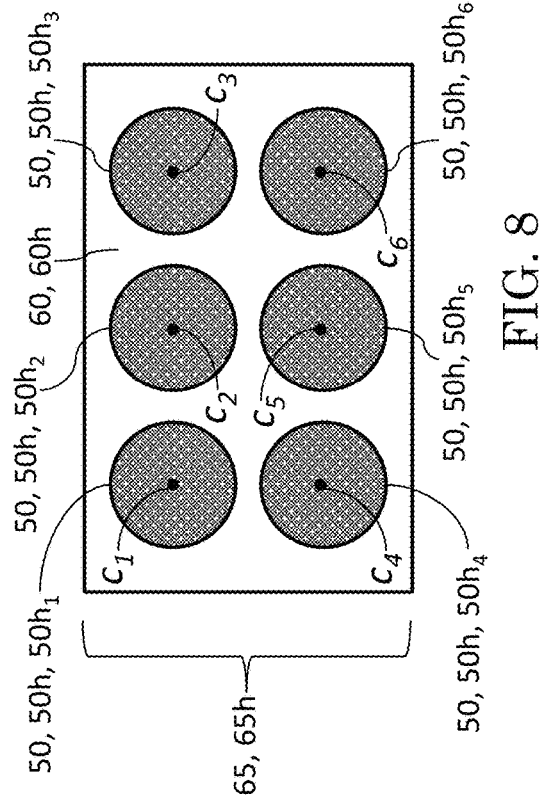
Figure 10:
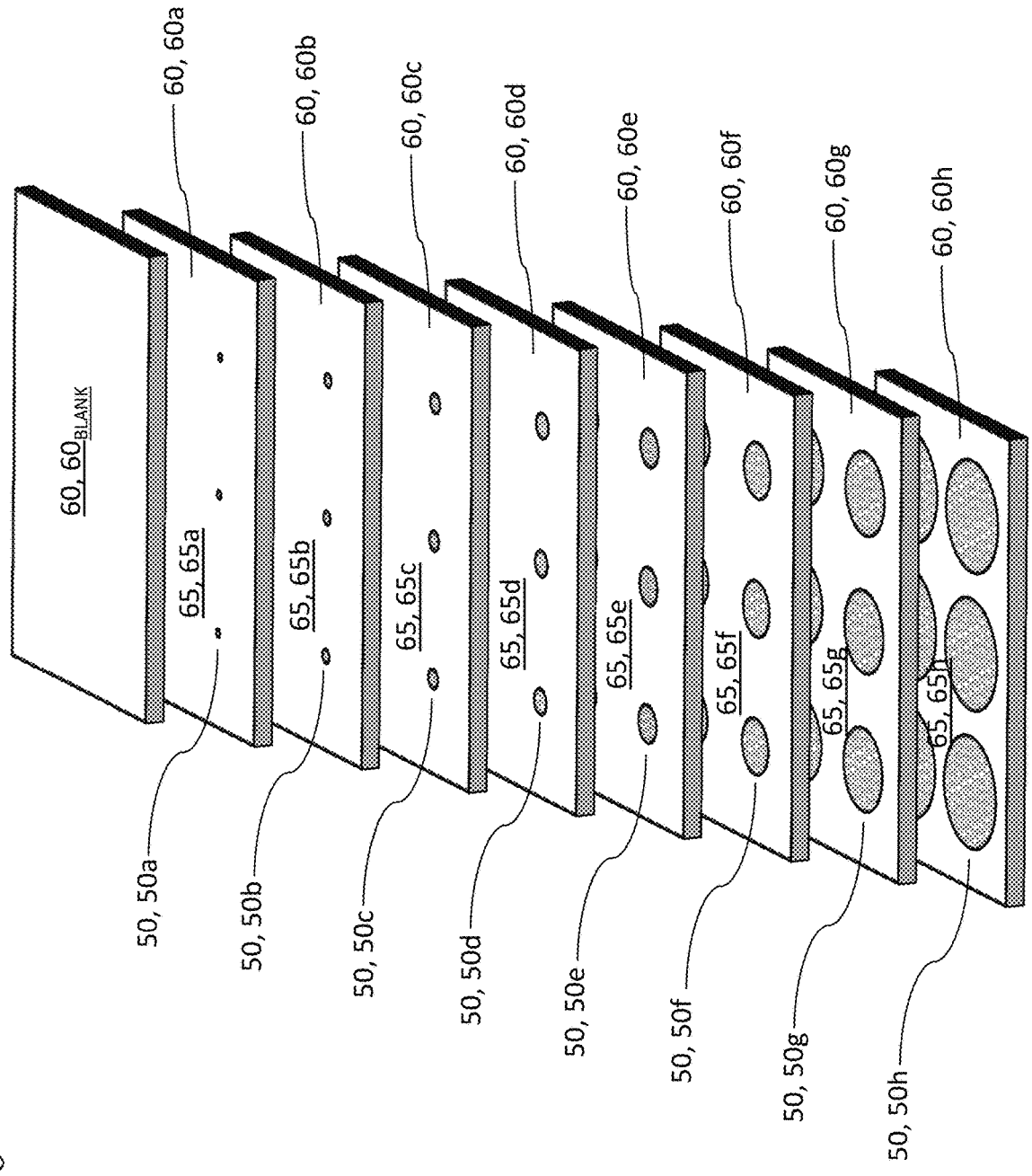

As FIG. 8 exemplifies, separately deposited on substrate 60h are six congruent circular ceramic quantities 50h, viz., $50h_1$, $50h_2$, $50h_3$, $50h_4$, $50h_5$, and $50h_6$ having, respectively, centers $c_1$, $c_2$, $c_3$, $c_4$, $c_5$, and $c_6$. FIG. 10 illustrates gradual increase in diameter of circular ceramic deposits 50 starting with ceramic deposit 50a and ending with ceramic deposit 50h. That is, in terms of size (e.g., diameter), $50a<50b<50c<50d<50e<50f<50g<50h$.

Figure 9:
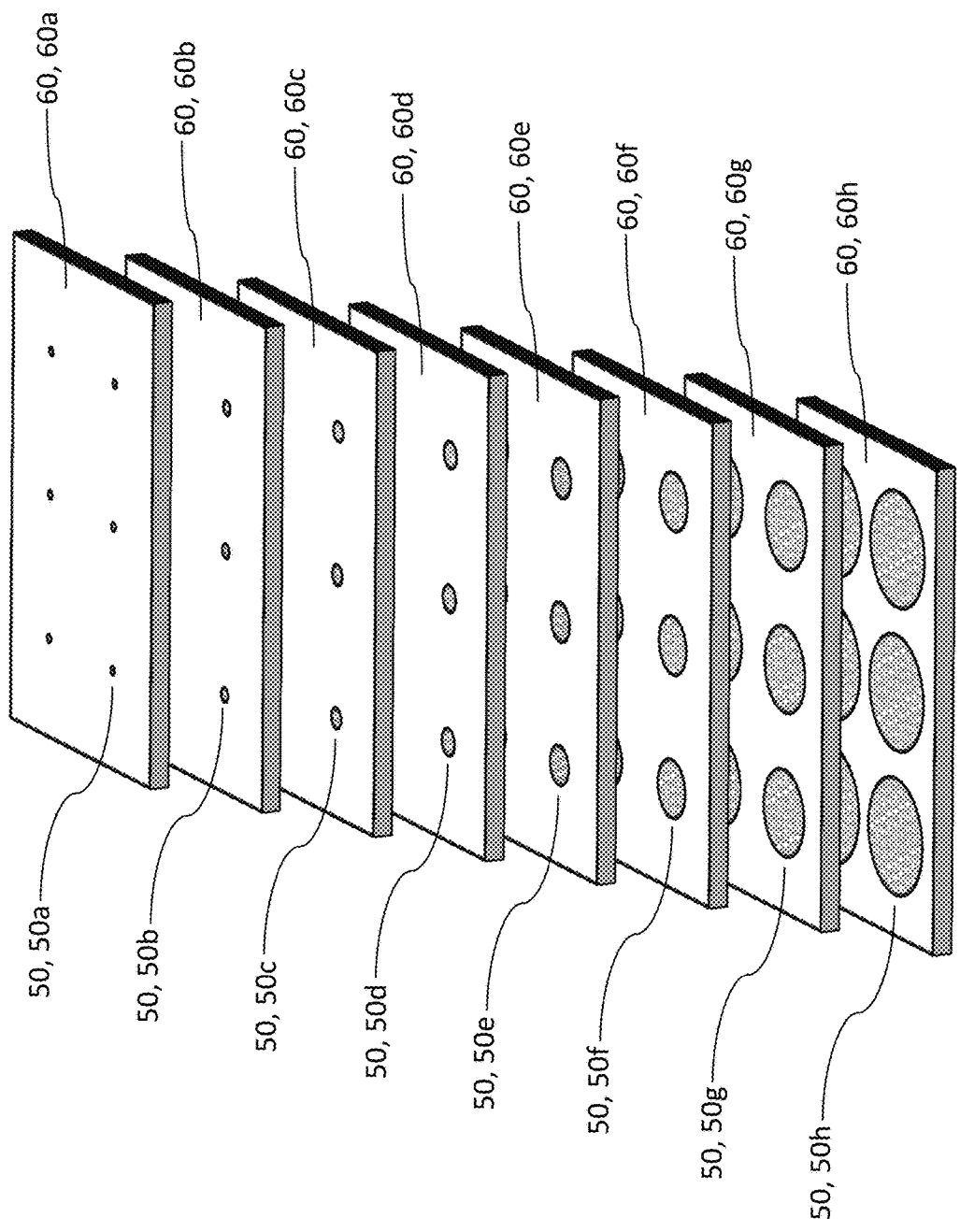
FIGS. 9 and 10 are similar diagrams each illustrating an example of a stacking procedure of several ceramic-deposited substrates.
Figure 13:
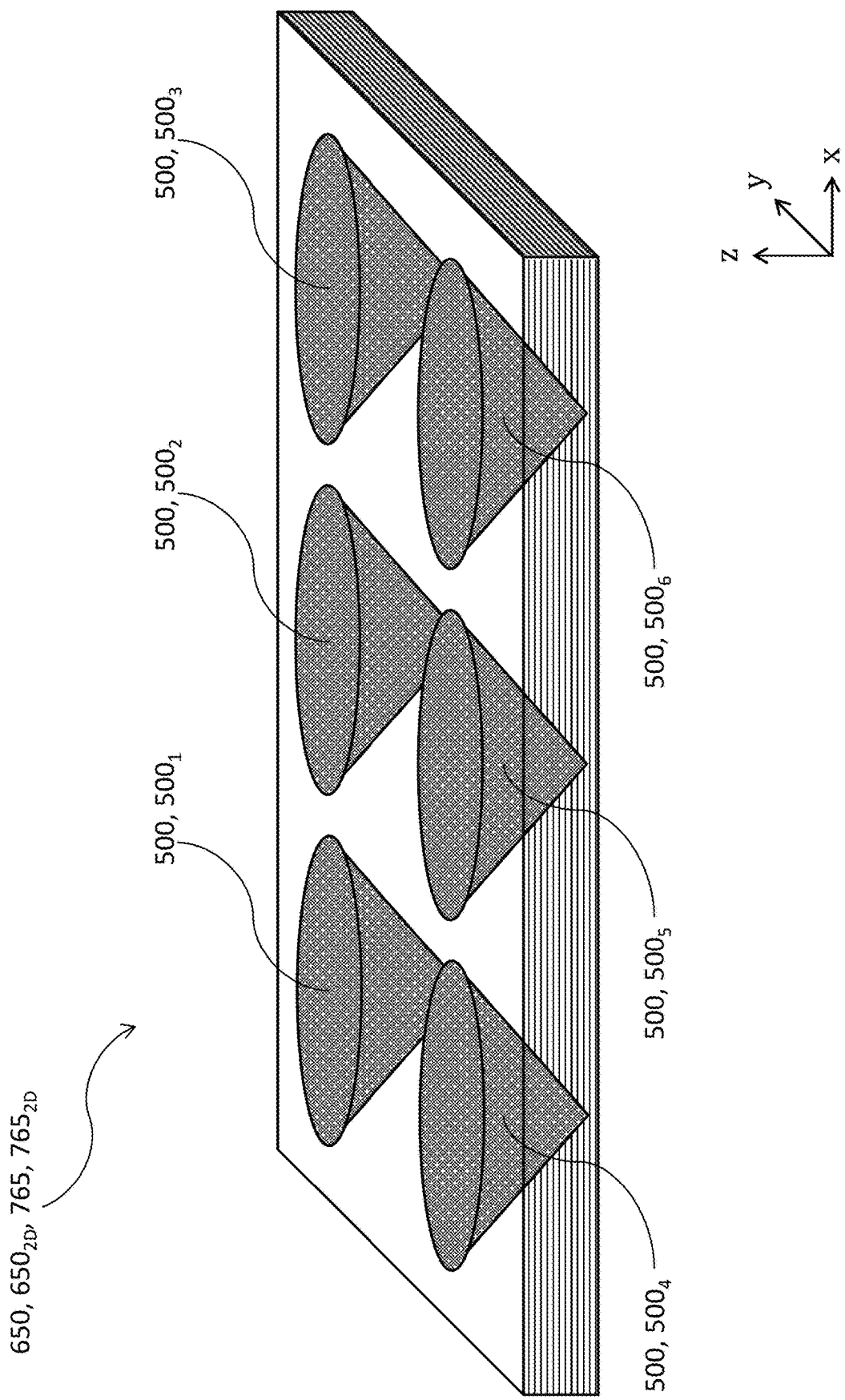
FIG. 13 is a diagrammatic perspective view of an embodiment of an inventive composite preform or product that includes a two-dimensional array of conical ceramic formations.
Figure 15:
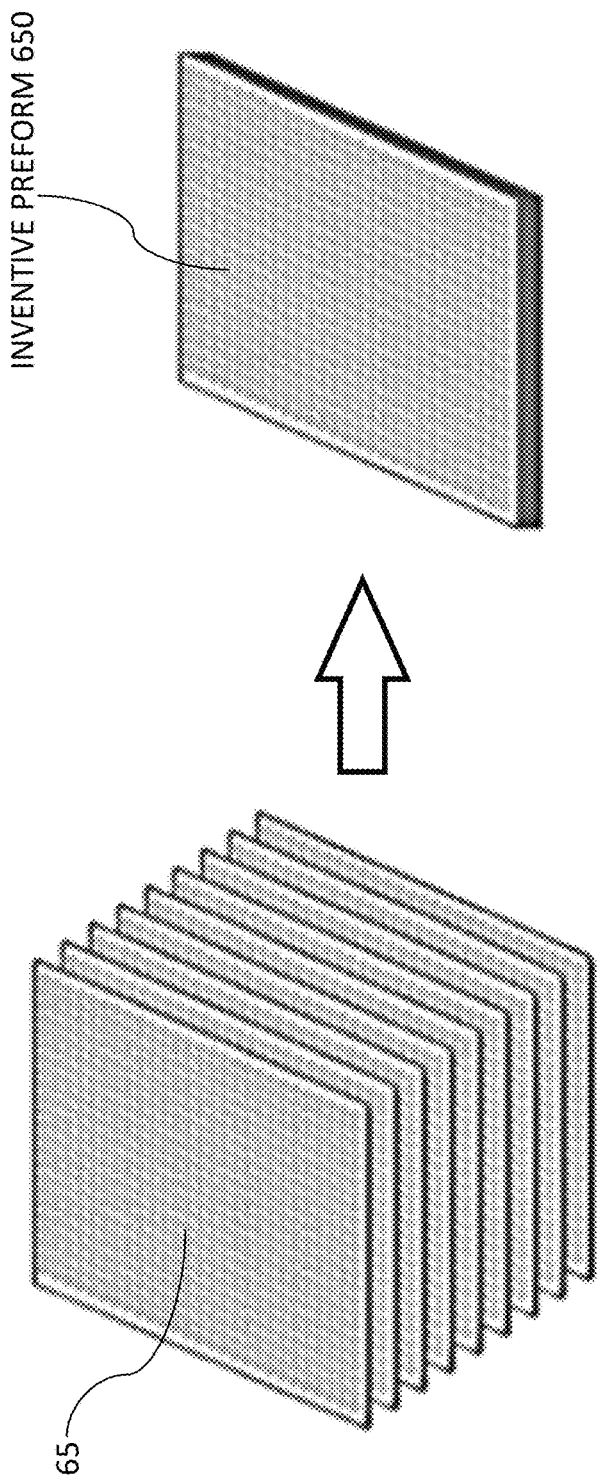

Substrates 60 (i.e., substrates 60a through 60h) have matching arrangements of the respective geometric centers c of the six circular ceramic quantities 50 deposited thereon. Accordingly, when eight horizontal substrates 60 having ceramic quantities 50 deposited thereon are vertically stacked to form a composite preform structure 650 having a rectangular prismatic geometric shape (e.g., as depicted in FIGS. 9, 13, and 15), the respective geometric centers c are vertically aligned along axis a in each of the six vertical geometrically defined groupings 500 of the ceramic quantities 50. Furthermore, as a result of the geometrically designed progressive increase in size of the ceramic deposits 50, each geometric ceramic shape 500 is conical.

Figure 11:
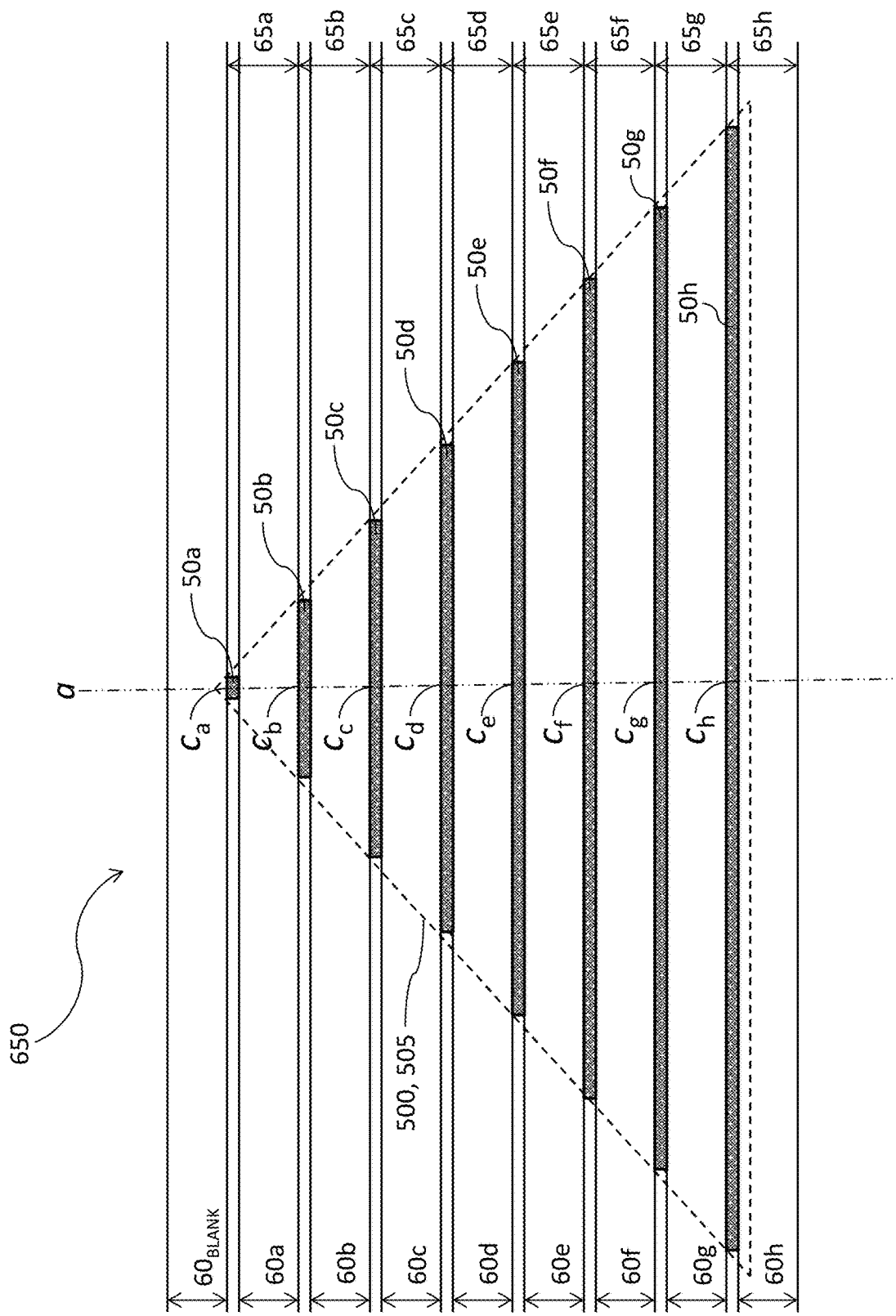
FIG. 11 is a partial diagrammatic elevation view of an inventive preform representing the adjoined stacking of the eight ceramic-deposited substrates and one blank substrate as illustrated in FIG. 10. As depicted by way of example in FIG. 11, the preform is characterized by a stratified (layered) configuration, and a conical ceramic inclusion is formed in the preform.

Geometric ceramic shapes 500 are synonymously referred to herein as ceramic "groupings," ceramic "inclusions," or "ceramic elements." Each ceramic grouping/inclusion/element 500 denotes a three-dimensional geometric ceramic shape that is collectively defined by a series of ceramic quantities 50 that are coaxially deposited upon successive parallel adjacent substrates 60 in accordance with the present invention. As shown in FIG. 11, conical ceramic grouping 500 is characterized by a vertical geometric axis a. In each conical ceramic grouping 500, deposited ceramic quantities 50a, 50b, 50c, 50d, 50e, 50f, 50g, and 50h have, respectively, centers $c_a$, $c_b$, $c_c$, $c_d$, $c_e$, $c_f$, $c_g$, and $c_h$, which lie in axis a.

As depicted in FIG. 13, the six conical ceramic elements 500 are designated $500_1$, $500_2$, $500_3$, $500_4$, $500_5$, and $500_6$. These six ceramic elements 500 are congruent, each describing the same conical geometric shape delineated by outline 505 in FIG. 11. Each conical ceramic element 500 is characterized by vertical geometric axis a, wherein the respective centers c are aligned along axis a, and wherein the corresponding deposited ceramic quantities 50 increase in diameter from the diametrically smallest 50a to the diametrically largest 50h. The ceramic deposit 50 diameters increase so that their respective circumferences lie in, and thereby define, geometric cone 505.

Figure 29:
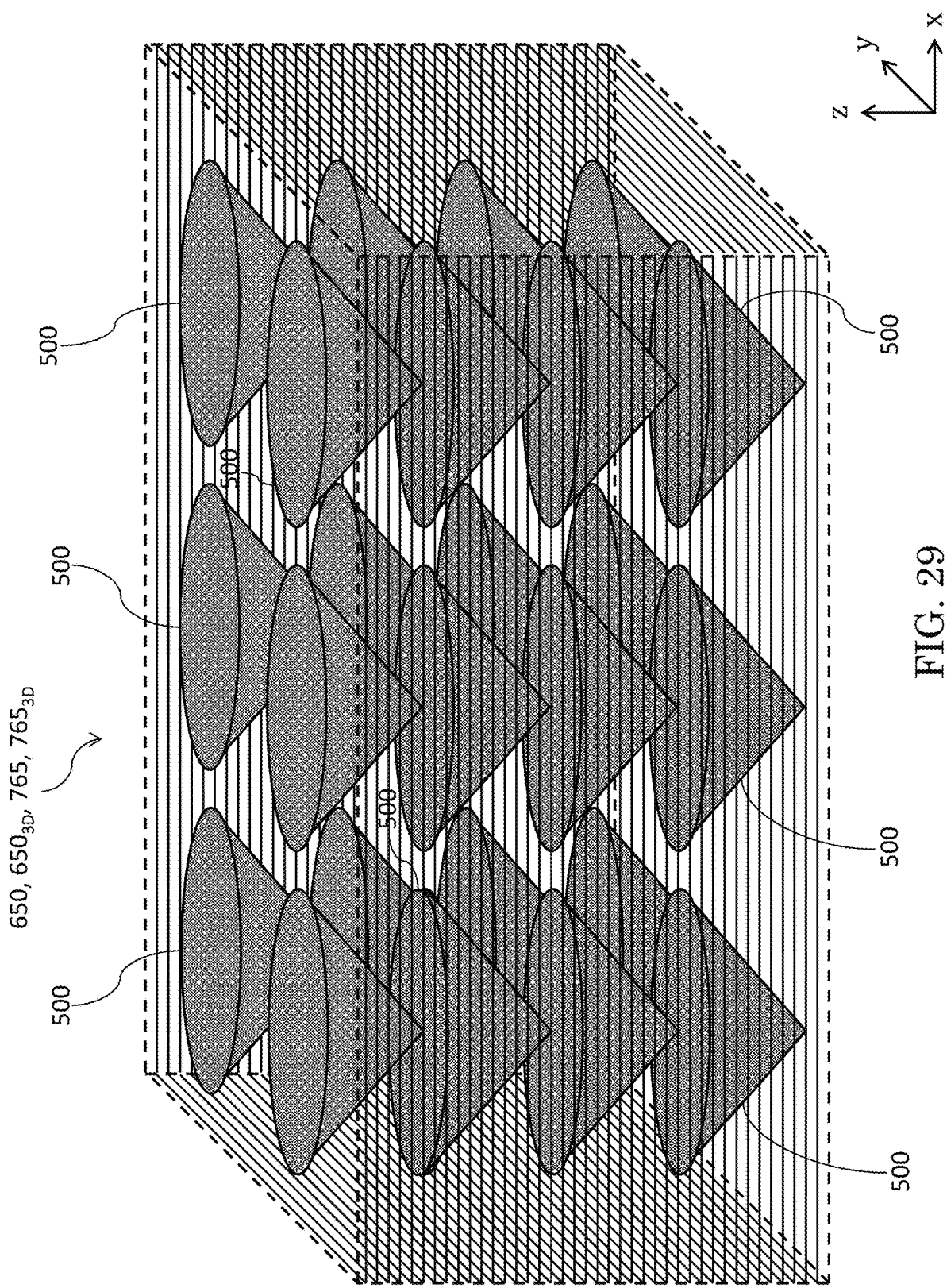
FIG. 29 is a diagrammatic perspective view of an embodiment of an inventive composite preform or product that includes a three-dimensional array of conical ceramic formations.

The present invention may be embodied, for example, as having a regular (e.g., periodic) arrangement of conical ceramic elements 500. As shown in FIG. 13 and FIG. 29, the inventive composite 765 describes a regular (e.g., periodic) pattern of ceramic fill material in cone-like geometric shapes, viz., ceramic groupings/inclusions $500_1$, $500_2$, $500_3$, $500_4$, $500_5$, and $500_6$. FIG. 13 depicts a two-dimensional array of congruent conical ceramic elements 500. In contrast, FIG. 29 depicts a three-dimensional array of the same congruent conical ceramic elements 500.

The inventive composite product $765_{3D}$ depicted in FIG. 29 is distinguishable from the inventive composite product $765_{2D}$ depicted in FIG. 13, albeit the conical ceramic formations 500 are same or similar. FIG. 13 shows the ceramic cones 500 arrayed in two dimensions (e.g., length x and width y), whereas FIG. 29 shows the ceramic cones 500 arrayed in three dimensions (e.g., length x, width y, and height z). The ceramic cones 500 are shown in FIG. 29 to be vertically collocated in successive horizontal arrays. Inventive practice is also possible whereby successive arrays of ceramic cones 500 do not comport with each other.

Inventive practice of composite systems having a regular arrangement of conical ceramic elements 500 may be propitious in terms of (i) armor (e.g., ballistic applications), (ii) structure, and (iii) electromagnetics.

Generally speaking, based on anecdotal evidence at least, use of conical ceramic geometries has previously been considered in the armor-related arts. Ceramic shapes that are partially conical in character are disclosed by Martin et al. U.S. Pat. No. 7,685,922 B1, incorporated herein by reference, and Moore, III et al. U.S. Pat. No. 7,866,248, incorporated herein by reference. Exemplary inventive practice implementing conical ceramic elements is believed by the present inventors to hold great promise in armor systems (e.g., ballistic applications).

Furthermore, inventive practice need not be compromising in effect with respect to the structural fortitude of a composite system. For instance, conical ceramic inclusions 500 may be configured in an inventive composite system so as to be insufficiently high in volume fraction to degrade the structural performance of the inventive composite system.

Conical ceramic elements 500 may act as impedance tapers, thereby allowing for all or substantially all of the electromagnetic energy at a particular band to transmit through the inventive composite system. For instance, an inventive composite system may act as a radome for a particular antenna or group of antennas. By way of example, an inventive composite system suitable for a radome application may be characterized by a ceramic deposit material made of magnesium oxide powder or titanium dioxide powder, a multilayer (multi-stratified) preform constructed of substrates made of fiberglass S-glass fabric, and a prepreg epoxy resin infused into the preform.

Figure 14:
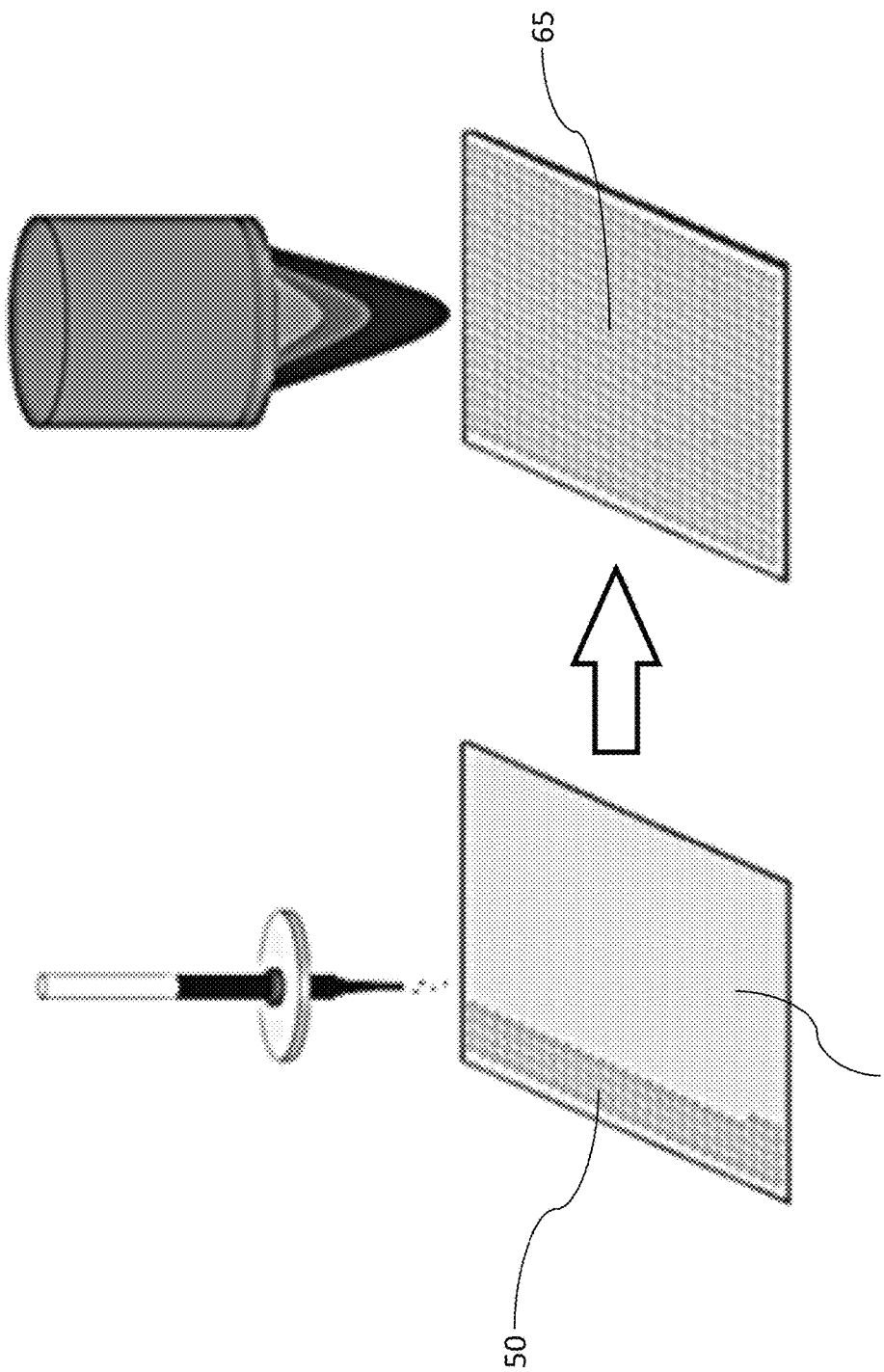
FIGS. 14 through 16 together represent a schematic of exemplary fabrication of an inventive composite structure.
Figure 16:
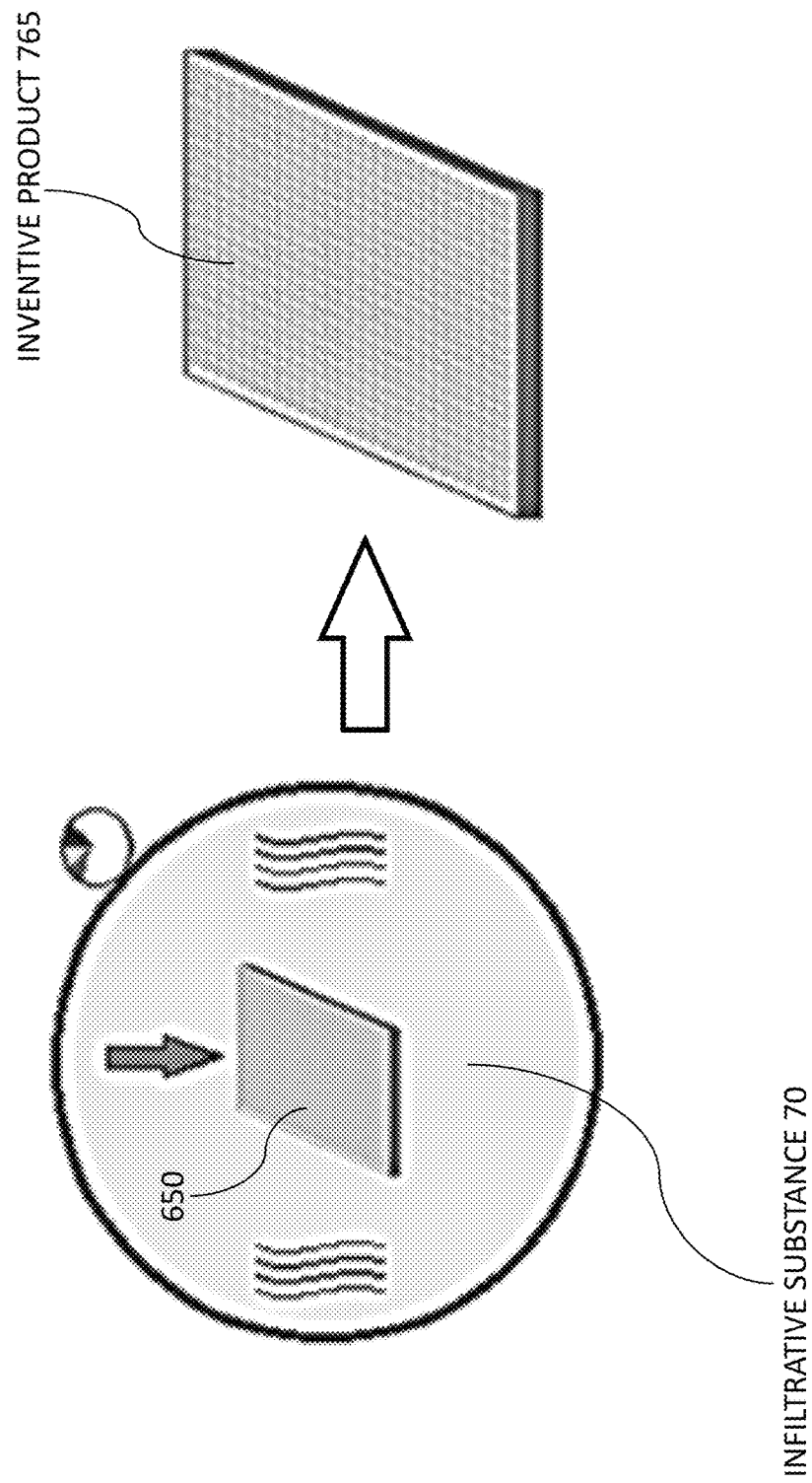

An example of inventive fabrication of a composite structure product 765 is illustrated in FIGS. 14 through 16. According to exemplary inventive practice, the ceramic material is a ballistic material that may be processed in powder form. A powder deposition system is employed to accurately deposit ceramic powder on structural composite fabric material. These fabrics are non-metallic (e.g., fiberglass) and may be woven or non-woven. Following deposition of the ceramic powder, these fabrics are stacked to form a three-dimensional structure with intentionally shaped ceramic inclusion compositions, such as the conical shapes described and illustrated herein by way of example. The fabric stack is then impregnated with structural or ballistic resins, such as a high-strain rate polymer or a low dielectric structural resin. An elastomer such as a high-strain rate polymer (e.g., polyurethane or polyurea) may be particularly suitable for armor applications. A resin (e.g., epoxy) may be particularly suitable for structural applications.

As shown in FIG. 14, discrete ceramic material quantities 50 are deposited on a bare substrate 60 (e.g., fiberglass cloth) to form a ceramic-deposited substrate 65. The ceramic deposition is performed with respect to several (e.g., eight, as shown in FIG. 15) substrates 60. Each substrate 60 has discrete ceramic material quantities 50 deposited thereon, thereby forming a ceramic-deposited substrate 65.

As shown in FIG. 15, the individual ceramic-deposited substrates 65 are stacked parallel and face-to-face, thereby forming a layered composite preform 650. The layers (strata) of preform 650 are constituted by the ceramic-deposited substrates 65.

As shown in FIG. 16, composite preform 650 is infiltrated with a polymer or resin 70 such as an elastomer or an epoxy resin, thereby forming a layered composite product 765. In essence, composite product 765 is a polymer-infused version of composite preform 650.

As depicted in FIGS. 11, 12, and 17 through 19, ceramic powder material is integrated with adjoining congruous fiberglass fabrics to form a three-dimensionally varying composite structure. FIG. 11 shows an example of a composite preform structure 650, which is the non-infiltrated version of composite structure product 765 shown in FIG. 12. Composite product 765 includes composite preform 650 and additionally includes polymeric (e.g., elastomeric) or resinous infiltrant 70.

Figure 12:
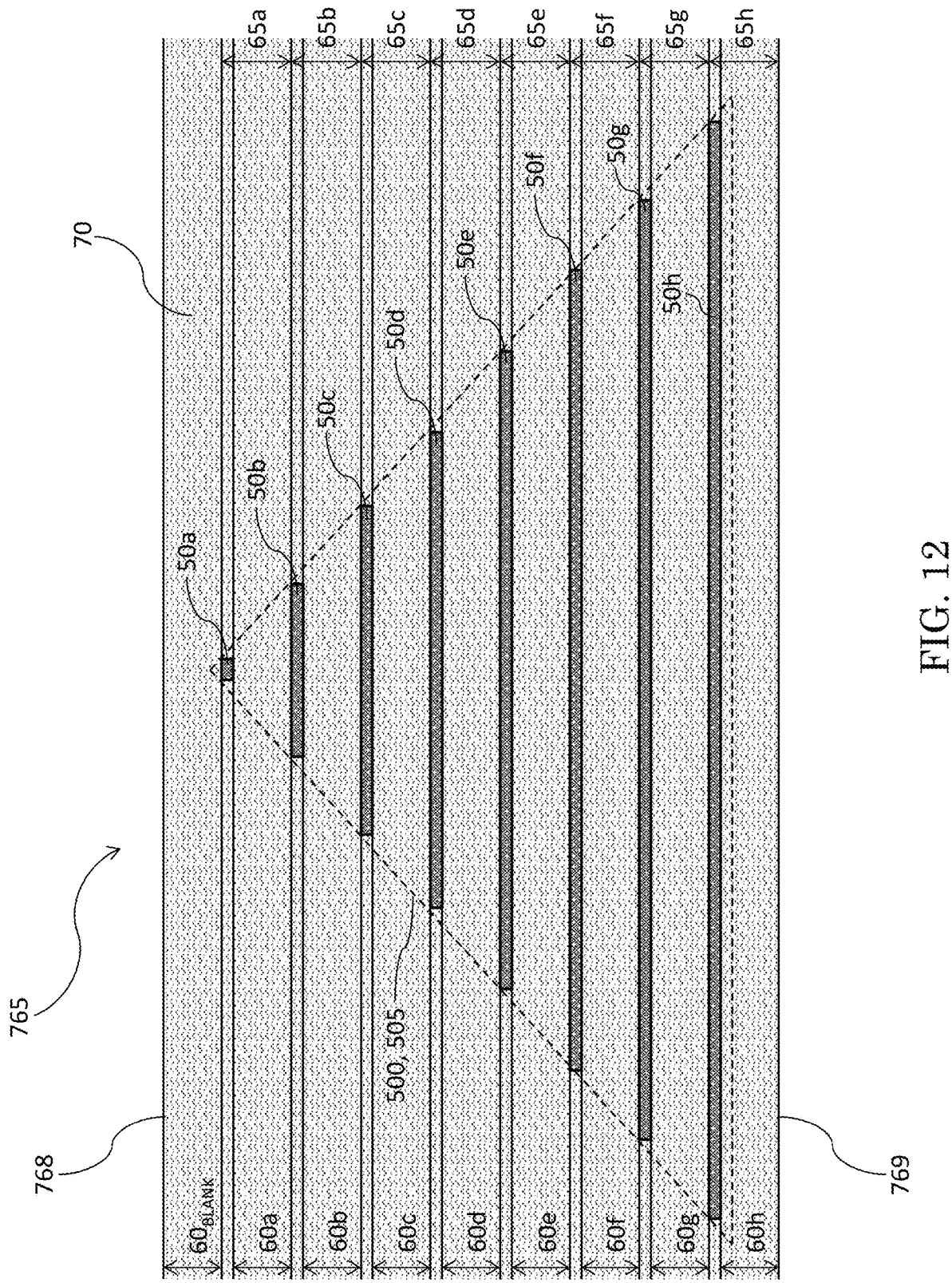
FIG. 12 is the view of FIG. 11 wherein the shown preform embodiment has been infiltrated with a matrix material such as a resin or an elastomer, thereby forming an inventive composite structure that has the configurative character of the preform but that additionally includes the matrix material.

As shown in FIG. 12, inventive composite 765 has two opposite surfaces, viz., a first surface 768 and a second surface 769. First surface 768 is contiguous the apices of the conical elements 50. Second surface 769 is contiguous the bases of the conical elements 50. In ballistic applications, exemplary inventive practice provides for implementation of inventive composite 765 whereby first surface 768 is the ballistic strike surface; however, inventive practice is possible whereby second surface 769 is the ballistic strike surface. Depending on the application, an inventive composite 765 can be implemented whereby either or both surfaces is/are the ballistic strike surface(s).

Figure 17:
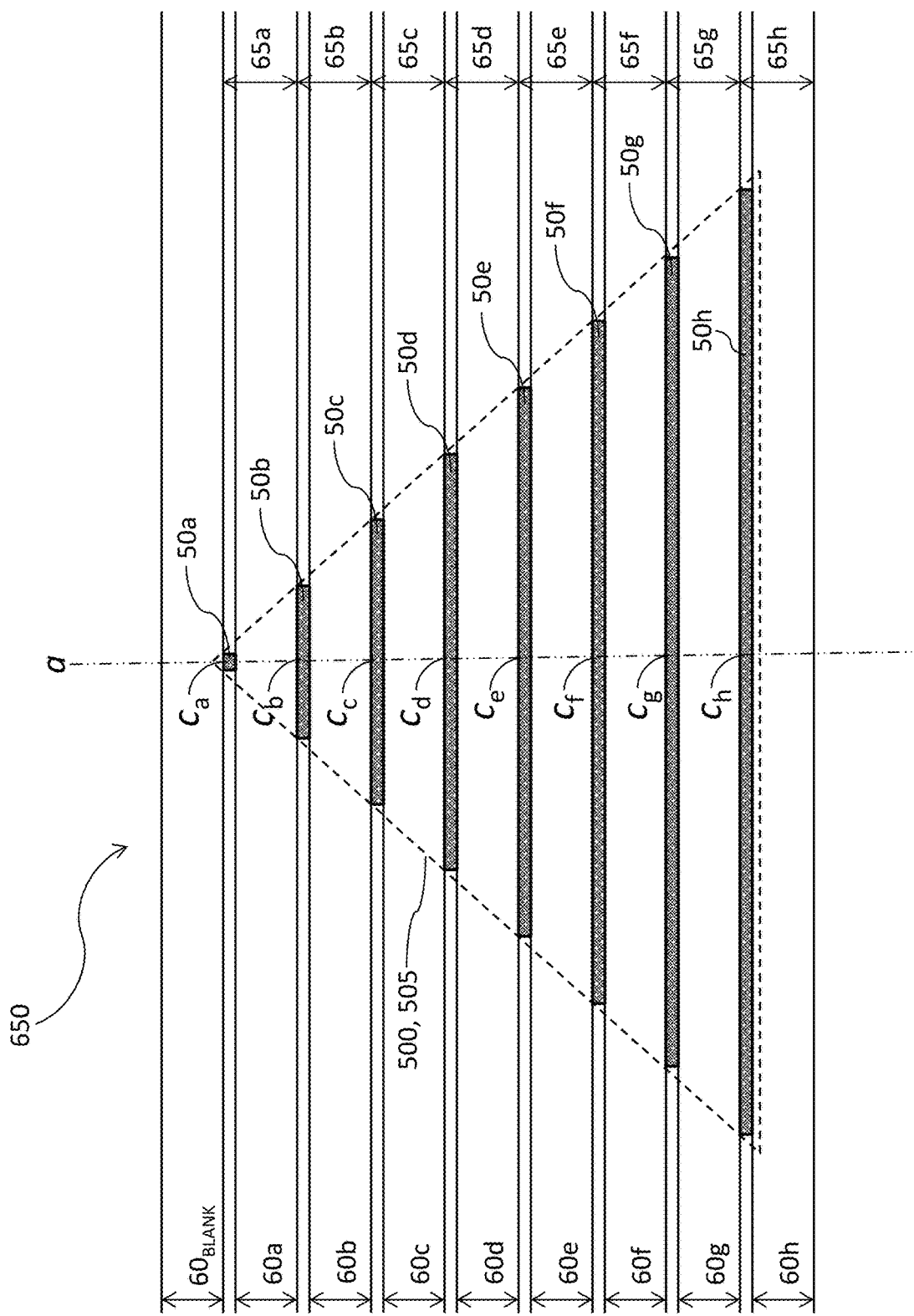
FIGS. 17 through 19 are partial diagrammatic elevation views, similar to the view of FIG. 11, of various other examples of preforms in accordance with the present invention.
Figure 18:
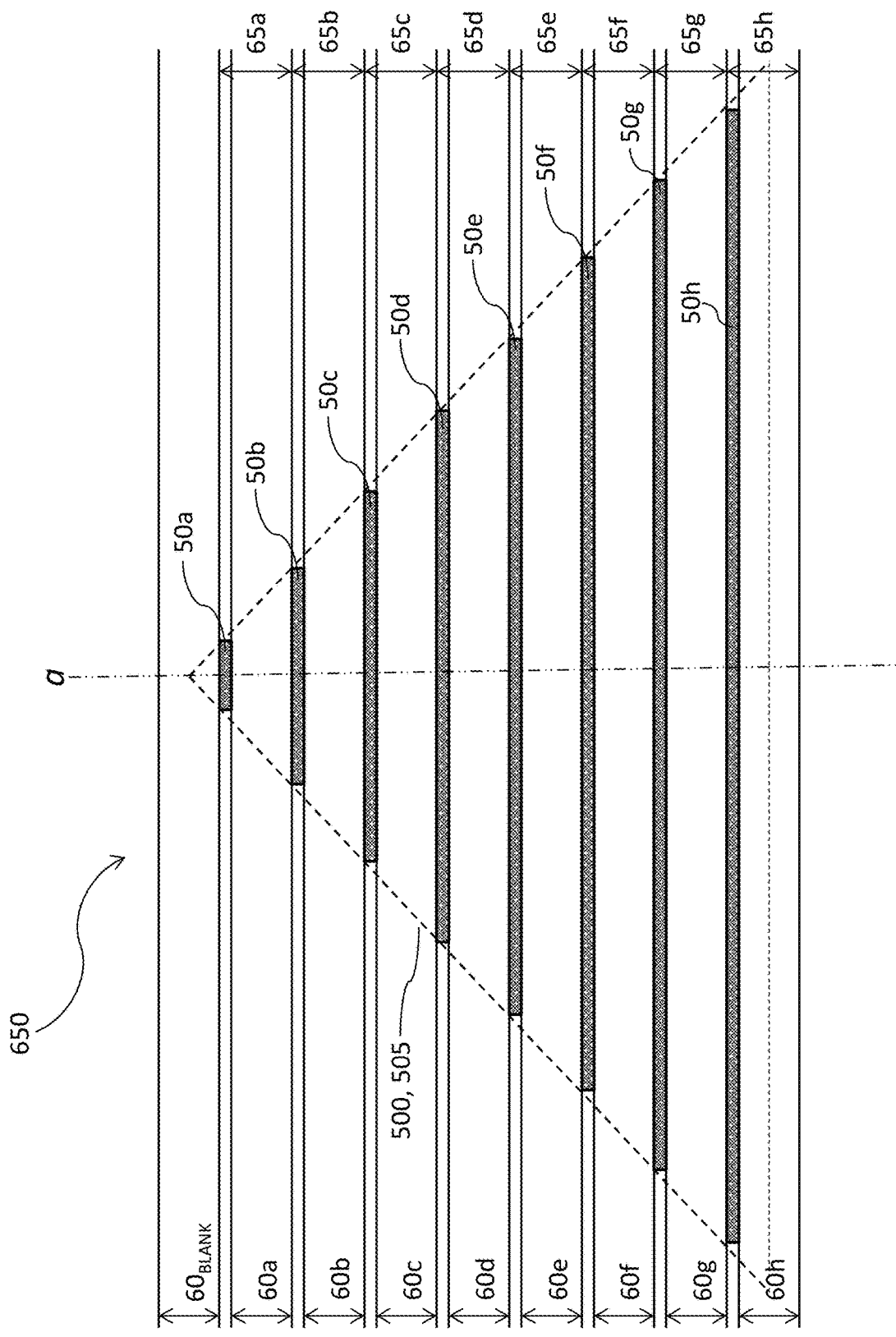
Figure 19:
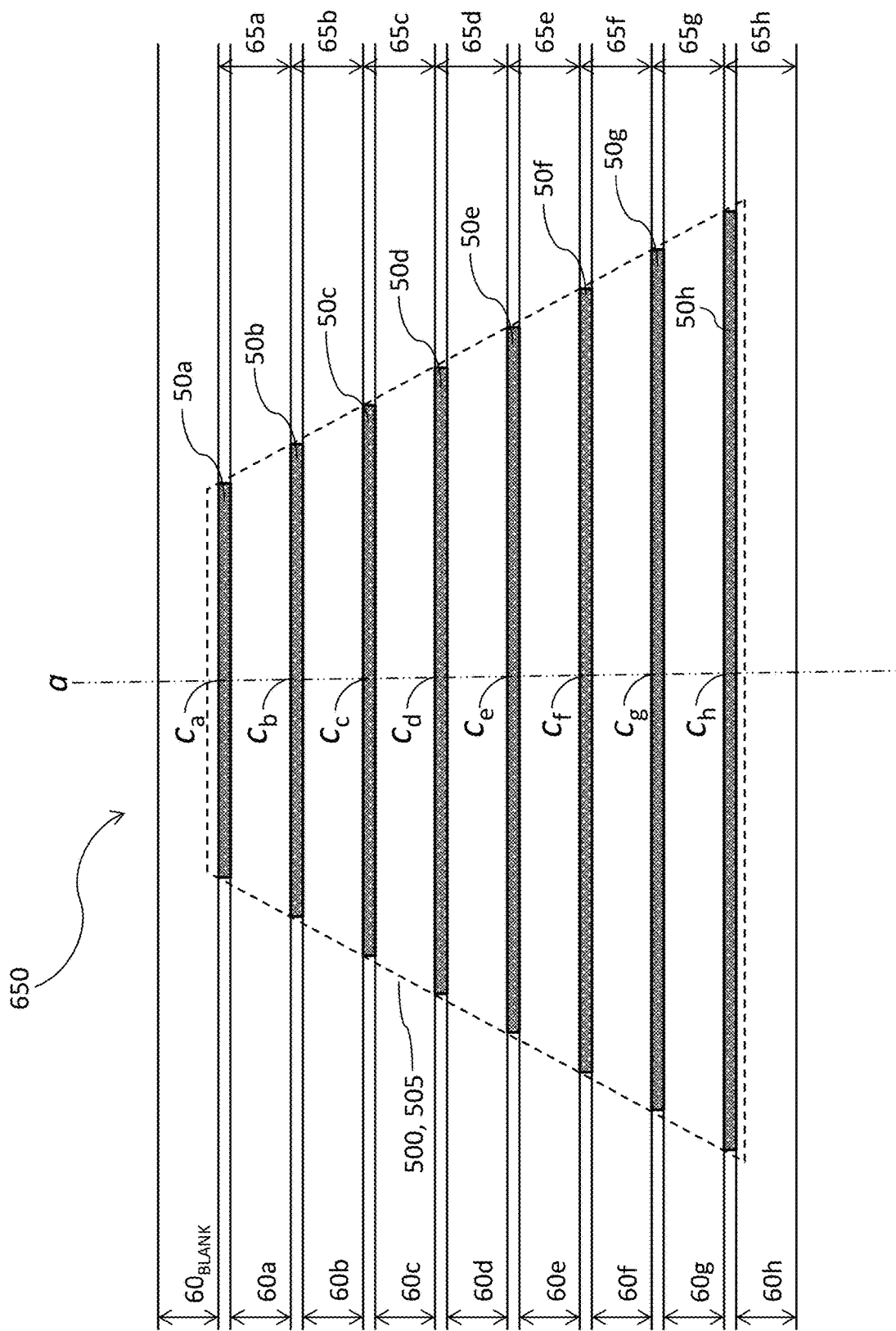

FIGS. 11, 12, and 17 through 19 can each be thought of as representative of either a composite preform 650 or a composite product 765, as in either case the composite preform 650 represents the framework of the overall structure. The ceramic element 500 shapes shown in FIGS. 11 and 12 approximately comport with the ceramic elements 500 shown in FIGS. 13 and 29. Like ceramic element 50 shown in FIGS. 11 and 12, ceramic elements 500 shown in FIGS. 17 and 18 are substantially conical. FIG. 18 may be accurately described as either substantially conical or slightly frustoconical. As compared with FIG. 18, FIG. 19 is more extensively frustoconical.

Inventive practice admits of multifarious shapes, thicknesses, materials, and/or arrangements of ceramic inclusions 500. For instance, ceramic inclusions 500 may be: either homogeneous or heterogeneous in size; either homogeneous or heterogeneous in geometric shape; either homogeneous or heterogeneous in material composition; either regular (e.g., periodic) or irregular (e.g., non-periodic) in arrangement or pattern. Mixtures of sizes and/or shapes and/or compositions of ceramic inclusions 500 are possible in inventive practice. Such homogeneities and heterogeneities may manifest in multifarious ways in inventive practice of either two-dimensionally arrayed ceramic elements 500 or three-dimensionally arrayed ceramic elements 500.

Figure 24:
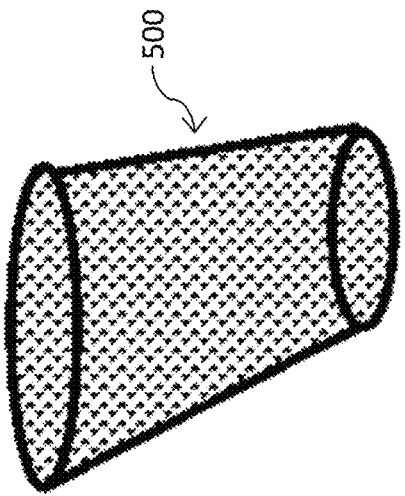
FIGS. 20 through 25 are similar diagrammatic perspective views of various other three-dimensional geometric ceramic shapes that can be constructed in accordance with the present invention.
Figure 25:
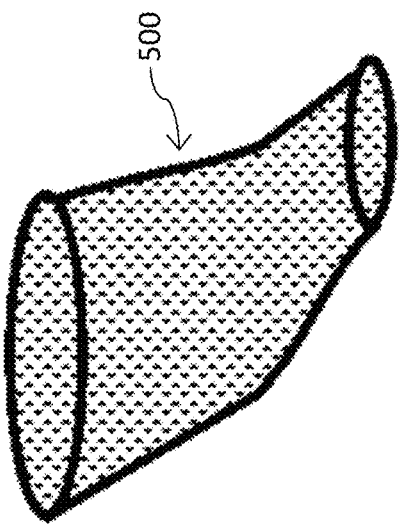
Figure 22:
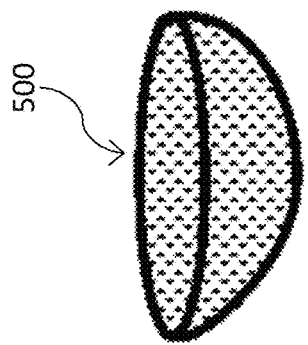
Figure 23:
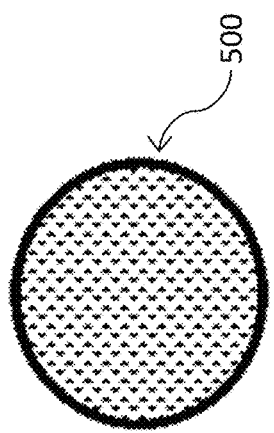
Figure 20:
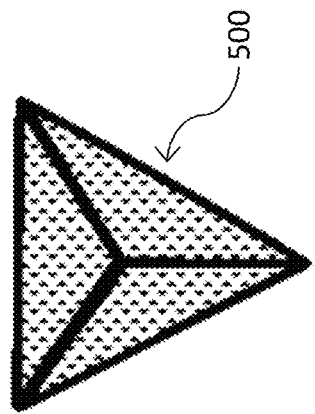
Figure 21:
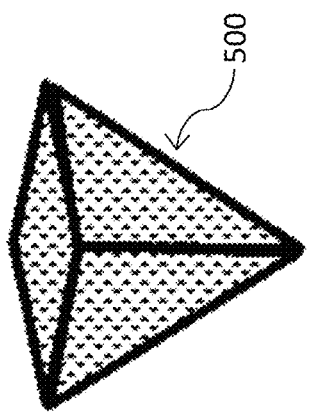
Figure 26:
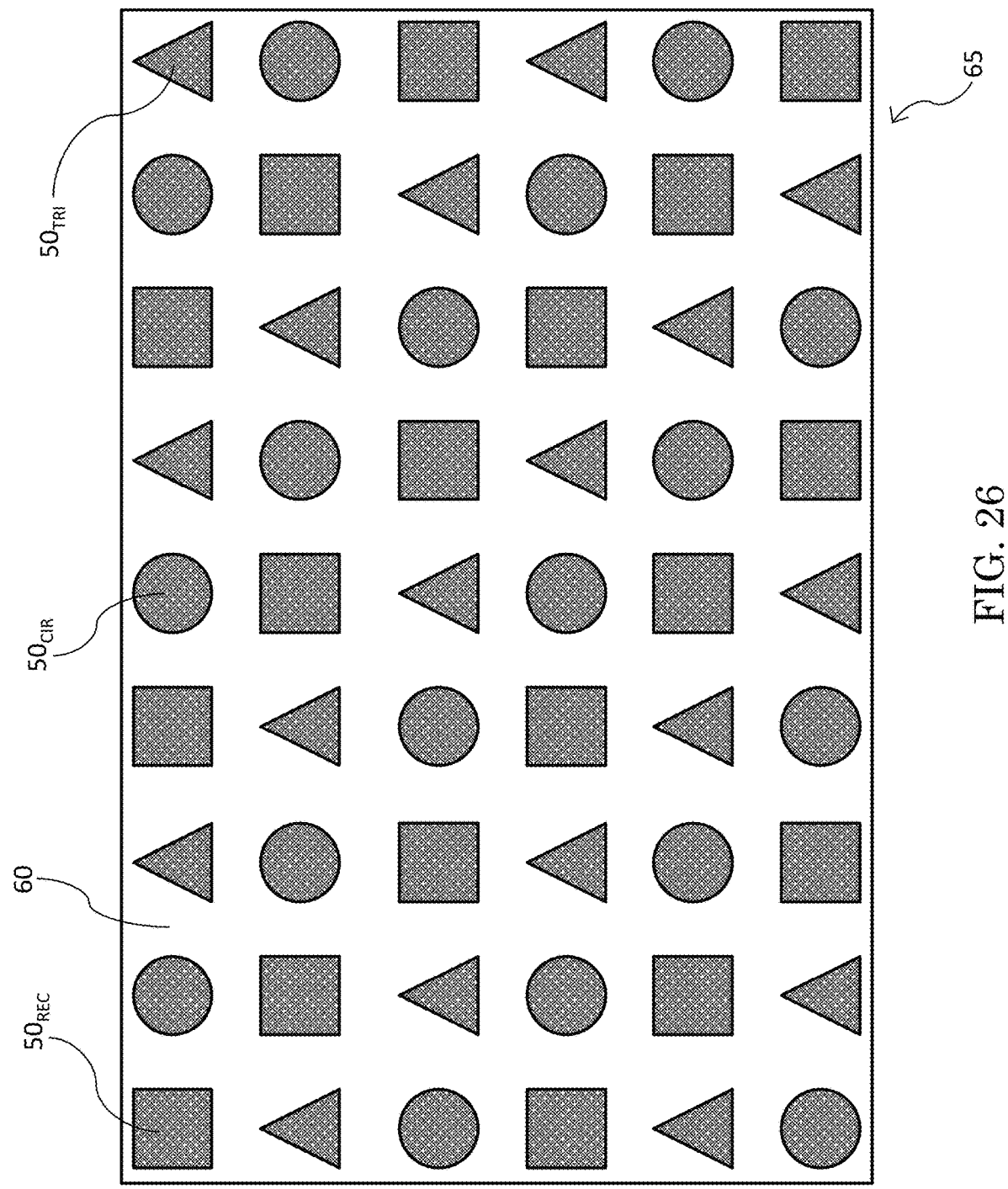
FIGS. 26 through 28 are similar diagrammatic plan views of different examples of ceramic-deposited substrates in accordance with the present invention. Each of these three figures illustrates a pattern of heterogeneously shaped ceramic deposits. The patterns in FIGS. 26 and 27 are regular; the pattern in FIG. 28 is irregular.
Figure 27:
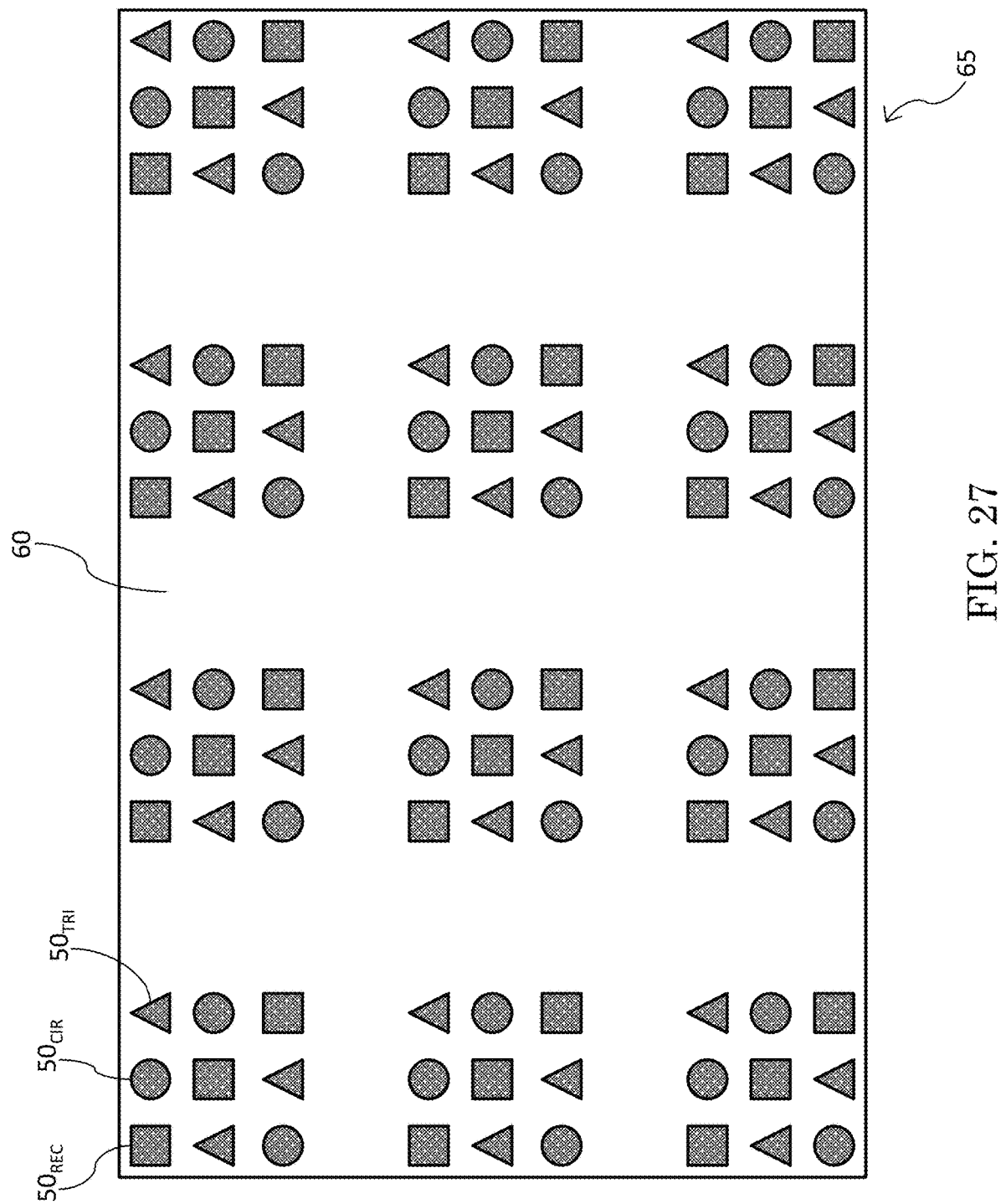
Figure 28:
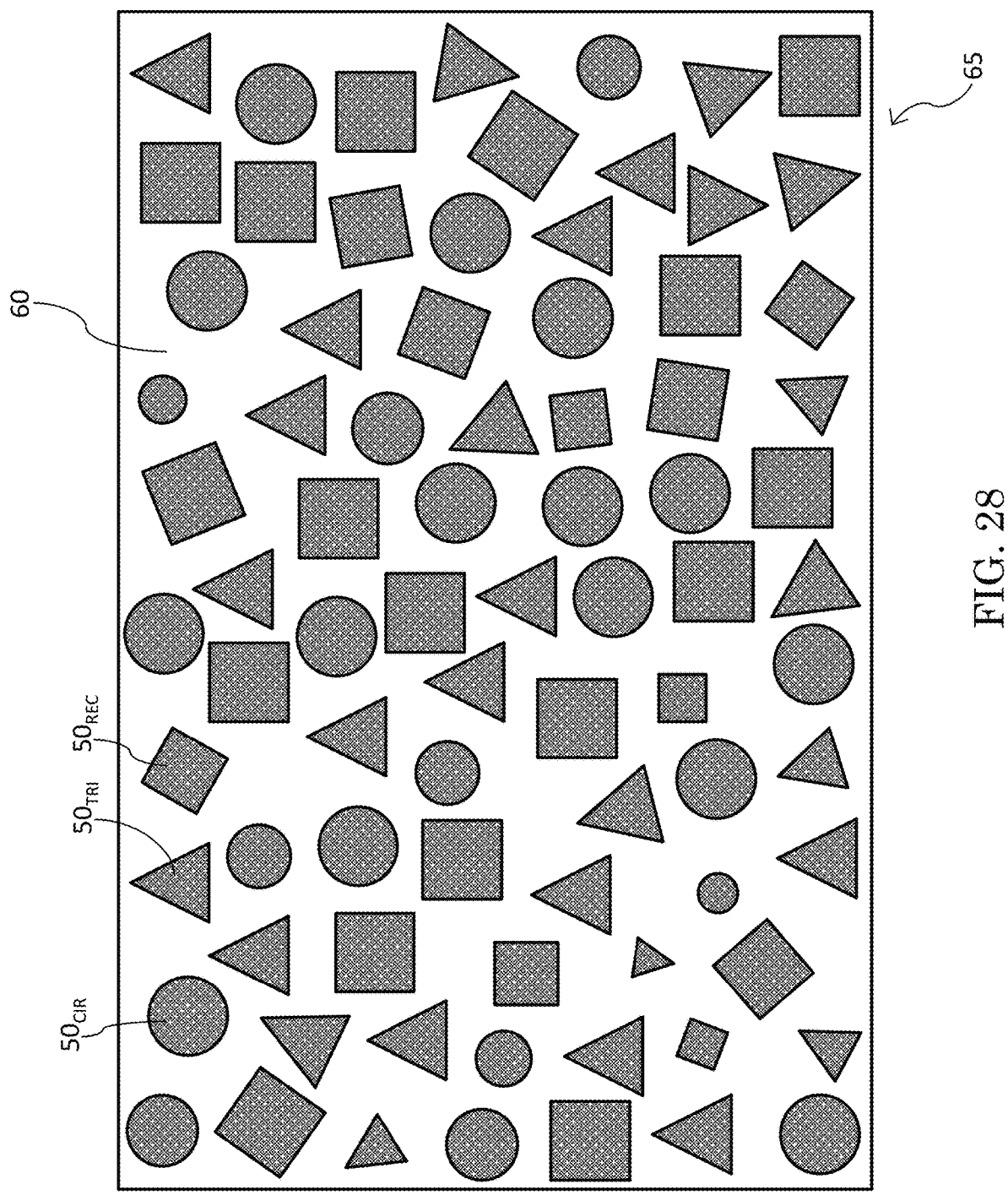

Previously described herein are examples of conical and truncated conical shapes of ceramic elements 500. Other examples of possible shapes of ceramic element 500 in inventive practice include but are not limited to: three-sided or triangular pyramid (FIG. 20); four-sided or rectangular pyramid (FIG. 21); half-dome or hemisphere (FIG. 22); ball or sphere (FIG. 23); slanted truncated cone or angled tapered rod (FIG. 24); curved truncated cone or curved tapered rod (FIG. 25).

Note that the shapes of ceramic element 500 need not have symmetrical profiles, such as exhibited by cones, truncated cones, pyramids, spheres, hemispheres, etc. For instance, curved or angled/slanted frustums and other asymmetric shapes (e.g., as shown in FIGS. 24 and 25) may be of interest to an inventive practitioner for ballistic purposes. Inventive practice of shapes, sizes, materials, and arrangements may be diverse. On the other hand, inventive practice is more limiting in terms of the formulation of the ceramic material, as it is usually a ceramic powder material or a ceramic powder-like slurry material.

Figure 30:
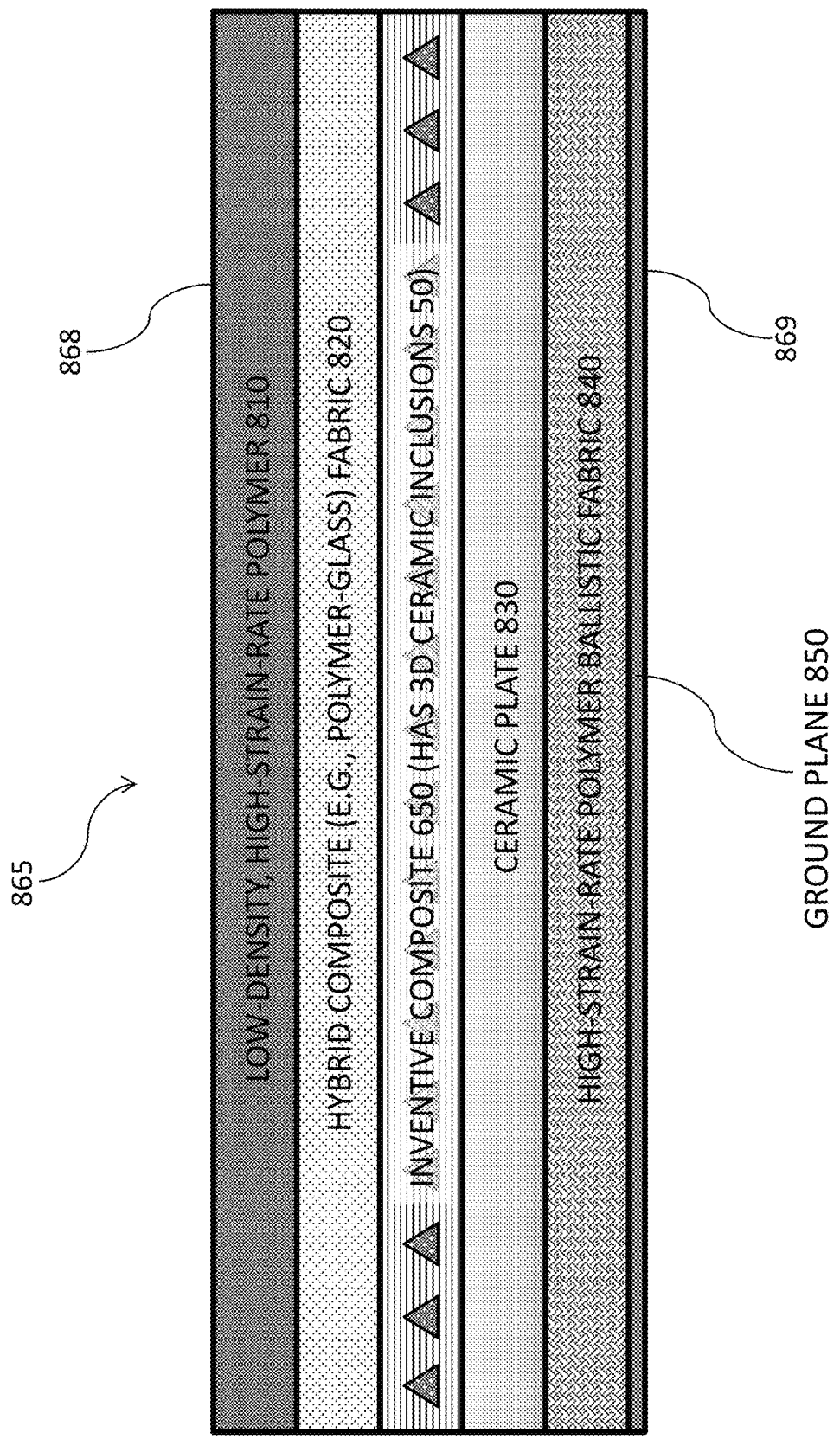
FIG. 30 and FIG. 31 are respective diagrammatic elevation views of two different embodiments of a composite armor system in accordance with the present invention.

With reference to FIG. 30, an inventive composite structure 765 such as described herein with reference to FIGS. 1 through 29 can be utilized as part of a larger whole to produce an inventive multi-stratified (multilayer) composite structure 865 having multifunctional properties similar to those afforded by inventive composite structure 765 alone. Similarly as can an inventive composite system 765, an inventive composite system 865 can provide three kinds of functional properties, viz., armor-protective (e.g., ballistic-resistant), electromagnetic-affective (e.g., radar-absorptive), and structural.

Inventive practice of an inventive stratified composite system 865, such as exemplified by FIG. 30, intrinsically integrates armor (e.g., ballistic armor), structural integrity, and electromagnetic (e.g., radar) spectrum absorption into a single composite structure. As shown in FIG. 30, stratified composite structure 865 includes six stacked parallel adjacent functional strata (layers) that are integrated into a composite system that is capable of defeating ballistic penetration. Front surface 868 and back surface 869 are opposite surfaces. Front surface 868, the exposed surface of first layer 810, is the strike surface of inventive composite system 865. Back surface 869, the exposed surface of sixth layer 850, is the rear-facing surface of inventive composite system 865.

The adjacent layers of inventive multilayer material system 865 include: (i) a low-density, high-strain-rate polymer first (front) layer 810; followed by (ii) a composite (e.g., polymer-glass) hybrid fabric second layer 820; followed by (iii) an inventive composite third layer 765 (e.g., the inventive composite product 765 shown in FIG. 13 or FIG. 29); followed by (iv) a ceramic plate fourth layer 830; followed by (v) a high-strain-rate polymer ballistic fabric fifth layer 840; followed by (vi) a ground plane sixth (back) layer 850.

The first layer 810 of the inventive composite system 865 shown in FIG. 30 is the ballistic strike layer. First layer 810 is, for instance, a high-strain-rate-hardening polymer (e.g., polyurethane, or polyurea, or a combination of polyurethane and polyurea) that is low in density and has self-healing and fragment-protection characteristics. Polymers that may exhibit high strain-rate-sensitivity-hardening include polyurea, polyurethane, and mixtures of polyurea and polyurethane. Examples of commercially available high strain-rate-sensitivity polyureas that may be suitable for inventive practice include Carboline® Polyclad® 707, Air Products Versalink® 1000, and SPI Polyshield® Hi-E.

High-strain-rate polymers are known to be effective against projectiles because they demonstrate high strain-rate-sensitivity-hardening when subjected to high rate loading. High strain-rate-sensitivity polymers (synonymously referred to herein as high-strain-rate-sensitivity elastomers) can be effective against projectiles because they become highly rigid when subjected to high rate loading by a projectile. The transient rigidity is a physical response to high rate loading, and creates a transient high-strength barrier to a penetrator. This physical rigidifying response creates a transient, very high-strength barrier to a penetrator. The transient rigidity of a high strain-rate-sensitivity-hardening polymer is significantly increased when the polymer is confined.

Many of the high strain-rate-sensitivity-hardening polymers that may be suitable for inventive practice demonstrate a Young's modulus of about 1,000 psi to 4,000 psi when tested at lower strain rates. At higher strain rates—e.g., in the range of about 1,000/second to 100,000/second—the high strain-rate-sensitivity polymer, when confined, demonstrates a Young's modulus of about 350,000 psi to 500,000 psi or greater, and an increase in tensile strength from about 2,000-8,000 psi to about 80,000 psi.

Examples of high strain-rate-sensitivity-hardening elastomers are disclosed in the following references, each of which is incorporated herein by reference: U.S. Pat. No. 7,300,893 B2 to Barsoum et al. entitled "Armor Including a Strain Rate Hardening Elastomer"; U.S. Pat. No. 7,794,808 B2 to Dudt et al. entitled "Elastomeric Damage-Control Barrier"; U.S. Pat. No. 7,938,053 to Dudt et al. entitled "Armor"; U.S. Pat. No. 7,946,211 B1 to Winchester et al. entitled "Electrical and Elastomeric Disruption of High-Velocity Projectiles"; U.S. Pat. No. 8,580,387 B1 to Fedderly et al. entitled "Polyurea Composite Armor."

The second layer 820 of the inventive composite system 865 shown in FIG. 30 is a hybrid (e.g., hybrid blend) composite fabric such as a polymer-glass (e.g., polypropylene-glass or aramid-glass) hybrid composite fabric, or a carbon-glass hybrid composite fabric, or a carbon-polymer hybrid blend composite fabric. An example of an aramid that may be a suitable aramid in an aramid-glass hybrid composite fabric is Kevlar®, a registered trademark of DuPont.

The third layer 765 of the inventive composite system 865 shown in FIG. 30 is an inventive composite product 765. For example, third layer 765 can have two-dimensionally arrayed ceramic elements 500, such as composite product $765_{2D}$ depicted in FIG. 13, or can have three-dimensionally arrayed ceramic elements 500, such as inventive composite product $765_{3D}$ depicted in FIG. 29. Third layer 765 is, for instance, an electromagnetically functional structural composite 765 having within it a number of homogeneously or heterogeneously shaped ballistic ceramic inclusions 500.

The fourth layer 830 of the inventive composite system 865 shown in FIG. 30 is a ceramic material plate suitable for ballistic armor protection, such as a plate composed of aluminum oxide. Ceramics suitable for inventive practice of fourth layer 840 include but are not limited to the ceramics previously noted herein as suitable for inventive practice of ceramic elements 500, viz.: aluminum oxide (alumina), silicon carbide, boron carbide, titanium carbide, tungsten carbide, magnesium oxide, titanium dioxide, and porcelain.

The fifth layer 840 of the inventive composite system 865 shown in FIG. 30 is a polymer ballistic fabric, such as an ultra-high molecular weight polyethylene (UHMWPE), or an aramid. The polymer ballistic fabric is characterized by high strain-rate-strengthening or high strain-to-failure, and according to many inventive embodiments is electromagnetically tailored. Examples of commercially available UHMWPE products are Dyneema® fabrics and Spectra® fabrics. An example of a commercially available aramid product is the aformentioned Kevlar®.

The sixth layer 850 of the inventive composite system 865 shown in FIG. 30 is a metallic (e.g., metal or alloy or metallized) groundplane sheet, for instance an aluminum foil or a carbon fiber sheet.

An inventive prototype structure 865 such as depicted in FIG. 30 was fabricated and tested by the United States Navy. Low-density, high-strain rate polymer layer 810 was a polyurethane. Hybrid composite fabric layer 820 was a polymer-glass hybrid fabric, namely, a polypropylene+E-Glass blended fabric. Inventive composite layer 650 included ballistic ceramic powder inclusions 500 and S-glass fabric substrates 60. Ceramic layer 830 was an aluminum oxide ceramic plate. High-strain rate polymer ballistic fabric layer 840 was a UHMWPE. Groundplane sheet layer 850 was an aluminum foil.

The tested example of inventive composite material system 865 represented a multifunctional material system, exhibiting all three functional milestones, viz., ballistic resistance, structural strength, and wideband radar attenuation with significant power loss within multiple radar bands. Prototype inventive system 865 withstood direct fire ballistic testing, with multi-hit defeat performance. Furthermore, the inventive prototype 865 exhibited structural integrity and significant wideband attenuation in radar bands of interest. Exemplary inventive system 865 demonstrated an ability to control electromagnetic energy at each material level of its composite stack.

Figure 31:
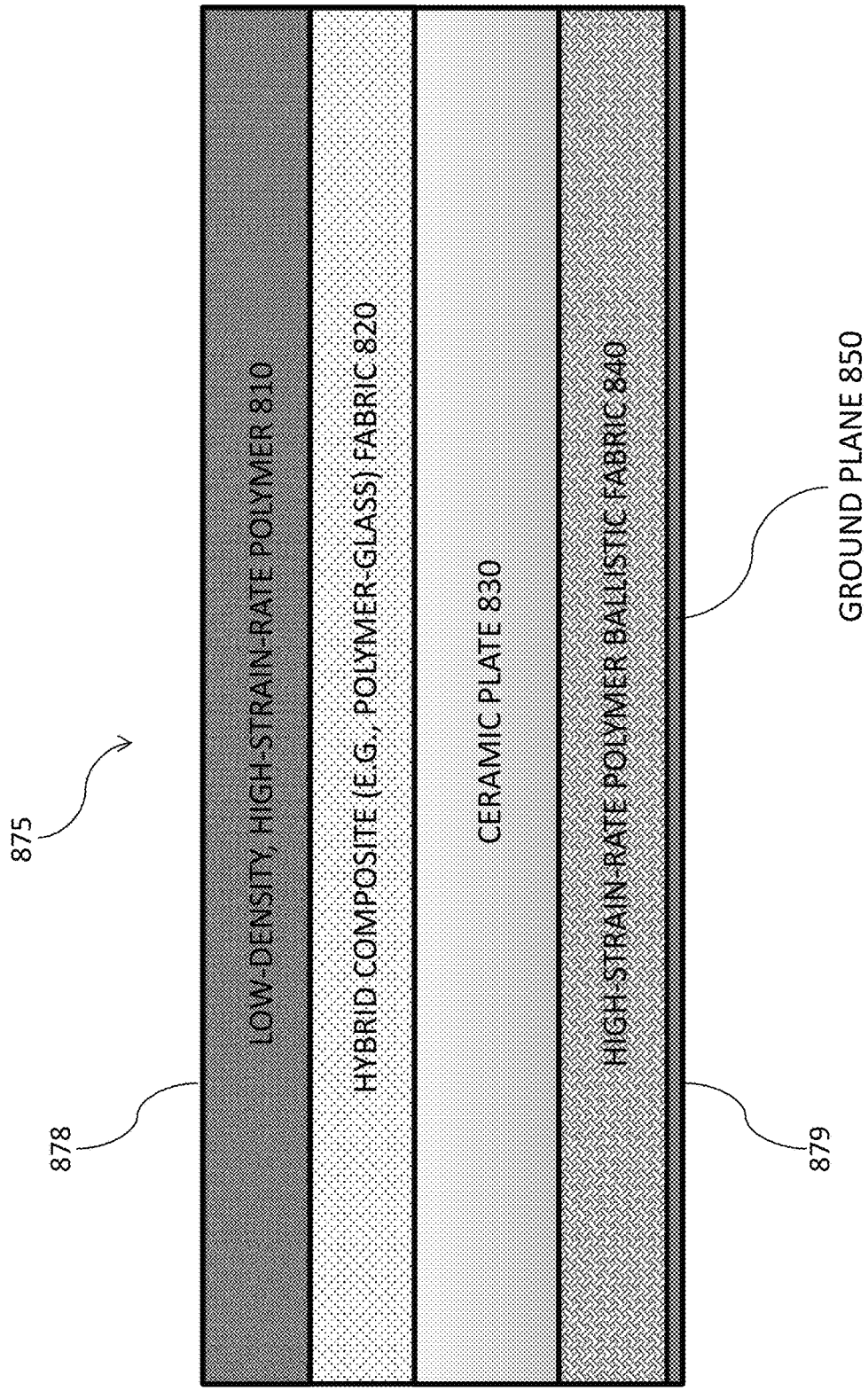

Inventive practice is also possible whereby one or more layers are omitted from multilayer composite material system 865. Now referring to FIG. 31, an alternative mode of inventive practice implements five of the six layers shown in FIG. 30. The multilayer composite material system 875 shown in FIG. 31 includes: (i) a low-density, high-strain-rate polymer first (front) layer 810; followed by (ii) a composite (e.g., polymer-glass) hybrid fabric second layer 820; followed by (iii) a ceramic plate third layer 830; followed by (iv) a high-strain-rate polymer ballistic fabric fourth layer 840; followed by (v) a ground plane fifth (back) layer 850.

Exemplary inventive layered material systems 865 and 875 similarly address armor, structural, and electromagnetic functionalities. Furthermore, both modes of inventive practice lend themselves to being variously embodied to meet various requirements, such as: more or less powerful ballistic threats; more or less stringent structural requirements; more or less radar attenuation; or any combination thereof. The variability of inventive design may be effected by adjusting thickness and/or material of one or more layers, and/or by removing one or more layers entirely.

For example, to meet a larger caliber round, the thickness and choice of ceramic plate 830 can be adjusted. Conversely, if the threat being met is not armor-piercing in nature, ceramic plate 830 can be removed entirely from the inventive structure. One or more layers from among layers 810, 820, 765, 830, 840, 840, and 860 can be expanded or contracted or removed, as requirements demand. Inventive material system 875 represents inventive composite material system 865 exclusive of inventive composite structure 765. Note that the thicknesses of the remaining layers of inventive material system 875 are increased, vis-à-vis the corresponding layers of inventive material system 865, in order to maintain all three functional requirements (i.e., ballistic, structural, electromagnetic).

Exemplary inventive practice of a layered composite material system may include, as a material base so to speak, an electromagnetically controlled high-strain rate polymer ballistic fabric 840 and/or an electromagnetically controlled conventional composite fabric 820. From there, the inventive system can include or exclude any material layer or layers from among inventive composite 765 (which includes 3D ceramic inclusions 50), ceramic plate 830, high strain-rate polymers 810, hybrid fabrics 820, and conventional ballistic composite fabrics 840.

Exemplary inventive practice functionally integrates and permits precise tailoring of, within a composite structure or system, at least two properties from among electromagnetic properties, ballistic properties, and structural properties. An inventive composite structure/system may be embodied to be characterized by: armor (e.g., ballistic) and structural functionalities; or, by armor (e.g., ballistic) and electromagnetic functionalities; or, by structural and electromagnetic functionalities. By integrating these functions, inventive structures and systems can be lighter, thinner, and mechanically stronger, and afford better ballistic and electromagnetic performance, as compared with conventional parasitic counterparts.

This application is related to U.S. patent application Ser. No. 15/360,734, filed 23 Nov. 2016, incorporated herein by reference, inventors Jonathan G. Kruft, Brandon L. Good, and David A. Roper, invention entitled "Composite Material System Including Elastomeric, Ceramic, and Fabric Layers."

The present invention, which is disclosed herein, is not to be limited by the embodiments described or illustrated herein, which are given by way of example and not of limitation. Other embodiments of the present invention will be apparent to those skilled in the art from a consideration of the instant disclosure, or from practice of the present invention. Various omissions, modifications, and changes to the principles disclosed herein may be made by one skilled in the art without departing from the true scope and spirit of the present invention, which is indicated by the following claims.

What is claimed is:

1. A composite structure comprising a preform and a matrix material infused in said preform, said preform including plural parallel planar continuous substrates and plural discrete flat circular ceramic material quantities deposited on each said substrate, each deposited said circular ceramic material quantity defining a two-dimensional circular shape and characterized by a geometric center and a diameter, said preform characterized by a layered configuration wherein said substrates adjoin and wherein separate groups of said circular ceramic material quantities are arranged in perpendicular alignment through the adjoined said substrates to describe corresponding three-dimensional ceramic material elements, each said ceramic material element characterized by a geometric axis and by either a conical shape or a truncated conical shape, wherein every pair of adjoining said substrates has contiguously therebetween said ceramic material quantities that are deposited on one of said pair of adjoining said substrates, each said three-dimensional ceramic material element being constituted by a said group of aligned said circular ceramic material quantities deposited on and separated by said substrates, wherein, with respect to each said three-dimensional ceramic material element, each said circular ceramic material quantity is deposited on a different said substrate, each pair of adjacent said ceramic material quantities has contiguously therebetween a said substrate, the respective said geometric centers of said circular ceramic material quantities align along said geometric axis, and said circular ceramic material quantities increase in diameter along said geometric axis from the diametrically smallest said circular ceramic material quantity to the diametrically largest said circular ceramic material quantity.

2. The composite structure of claim 1, wherein said matrix material is an epoxy.

3. The composite structure of claim 1, wherein said matrix material is an elastomer.

4. The composite structure of claim 1, wherein each said substrate is a fiberglass fabric.

5. The composite structure of claim 1, wherein said ceramic material includes at least one ceramic selected from the group consisting of aluminum oxide, silicon carbide, boron carbide, titanium carbide, tungsten carbide, magnesium oxide, titanium dioxide, silicon nitride, and porcelain.

6. A method for making a composite structure, the method comprising:
   providing a preform, said preform including plural parallel substrates and plural discrete circular ceramic material quantities deposited on each said substrate, each deposited said circular ceramic material quantity characterized by a geometric center and a diameter, said preform characterized by a layered configuration wherein said substrates adjoin and wherein separate groups of said circular ceramic material quantities are arranged in perpendicular alignment through the adjoined said substrates to describe corresponding three-dimensional ceramic material elements, each said ceramic material element characterized by a geometric axis and by either a conical shape or a truncated conical shape, wherein every pair of adjoining said substrates has therebetween said ceramic material quantities that are deposited on one of said pair of adjoining said substrates, each said three-dimensional ceramic material element being constituted by a said group of said circular ceramic material quantities deposited on and separated by said substrates, wherein, with respect to each said three-dimensional ceramic material element, each said circular ceramic material quantity is deposited on a different said substrate, each pair of adjacent said ceramic material quantities has contiguously therebetween a said substrate, the respective said geometric centers of said circular ceramic material quantities align along said geometric axis, and said circular ceramic material quantities increase in diameter along said geometric axis from the diametrically smallest said circular ceramic material quantity to the diametrically largest said circular ceramic material quantity; and
   infusing matrix material in said preform.

7. The method for making a composite structure as recited by claim 6, wherein said matrix material is at least one of an epoxy and an elastomer.

8. The method for making a composite structure as recited by claim 6, wherein each said substrate is a fiberglass fabric.

9. The method for making a composite structure as recited by claim 6, wherein said ceramic material includes at least one ceramic selected from the group consisting of aluminum oxide, silicon carbide, boron carbide, titanium carbide, tungsten carbide, magnesium oxide, titanium dioxide, silicon nitride, and porcelain.

10. A method for making a composite structure, the method comprising:
    providing plural parallel substrates;
    depositing plural discrete ceramic material quantities on each said substrate, each deposited said ceramic material quantity characterized by a geometric center and a symmetrical profile about said geometric center;
    producing a preform characterized by a layered configuration, said producing of said preform including stacking said substrates each having said material quantities deposited thereon, said stacking being performed wherein said substrates adjoin and wherein separate groups of said deposited ceramic material quantities are arranged in perpendicular alignment through the adjoined said substrates to describe corresponding three-dimensional ceramic material elements, each said ceramic material element characterized by a geometric axis, wherein every pair of adjoining said substrates has therebetween said ceramic material quantities that are deposited on one of said adjoining pair of said substrates, each said three-dimensional ceramic material element being constituted by a said group of said ceramic material quantities deposited on and separated by said substrates, wherein, with respect to each said three-dimensional ceramic material element, each said ceramic material quantity is deposited on a different said substrate, each pair of adjacent said ceramic material quantities has therebetween a said substrate, and the respective said geometric centers of said ceramic material quantities align along said geometric axis; and
    infusing matrix material in said preform.

11. The method for making a composite structure as recited by claim 10, wherein said matrix material is at least one of an epoxy and an elastomer.

12. The method for making a composite structure as recited by claim 10, wherein each said substrate is a fiberglass fabric.

13. The method for making a composite structure as recited by claim 10, wherein said ceramic material includes at least one ceramic selected from the group consisting of aluminum oxide, silicon carbide, boron carbide, titanium carbide, tungsten carbide, magnesium oxide, titanium dioxide, silicon nitride, and porcelain.

14. The method for making a composite structure as recited by claim 10, wherein said three-dimensional ceramic material shapes are characterized by at least one geometric shape selected from the group consisting of conical, truncated conical, pyramidal, and truncated pyramidal.

15. The composite structure of claim 1, wherein each said three-dimensional ceramic material element is characterized by:
    a layered alternation along said geometric axis of said circular ceramic material quantities and said substrates;
    deposition of successive adjacent said circular ceramic material quantities on successive adjoining said substrates.

16. The method for making a composite structure as recited by claim 6, wherein each said three-dimensional ceramic material element is characterized by:
    a layered alternation along said geometric axis of said circular ceramic material quantities and said substrates;
    deposition of successive adjacent said circular ceramic material quantities on successive adjoining said substrates.

17. The method for making a composite structure as recited by claim 10, wherein each said three-dimensional ceramic material element is characterized by:
    a layered alternation along said geometric axis of said ceramic material quantities and said substrates;
    deposition of successive adjacent said ceramic material quantities on successive adjoining said substrates.

18. The composite structure of claim 1 comprising at least two said preforms, wherein said matrix material is infused in said at least two preforms, and wherein said at least two preforms are arranged to represent a three-dimensional array of said three-dimensional ceramic material elements.

19. The method for making a composite structure as recited by claim 6, wherein said providing of said preform is providing at least two said preforms, wherein said matrix material is infused in said at least two preforms, and wherein said at least two preforms are arranged to represent a three-dimensional array of said three-dimensional ceramic material elements.

20. The method for making a composite structure as recited by claim 10, wherein said producing of said preform is producing at least two said preforms, wherein said matrix material is infused in said at least two preforms, and wherein said at least two preforms are arranged to represent a three-dimensional array of said three-dimensional ceramic material elements.

21. The method for making a composite structure as recited by claim 10, wherein the corresponding said symmetrical profiles of said ceramic material quantities increase in size along said geometric axis from the smallest said ceramic material quantity to the largest said ceramic material quantity.

22. The method for making a composite structure as recited by claim 10, wherein:
   each said ceramic material quantity is circular;
   each said ceramic material element is characterized by either a conical shape or a truncated conical shape;
   said circular ceramic material quantities increase in diameter along said geometric axis from the diametrically smallest said circular ceramic material quantity to the diametrically largest said circular ceramic material quantity.

23. The method for making a composite structure as recited by claim 14, wherein:
   said pyramidal geometric shape is selected from the group consisting of triangular pyramidal geometric shape and rectangular pyramidal geometric shape;
   said truncated pyramidal geometric shape is selected from the group consisting of truncated triangular pyramidal geometric shape and truncated rectangular pyramidal geometric shape.

\* \* \* \* \*